United States Patent
Aoki

(10) Patent No.: US 11,563,905 B2
(45) Date of Patent: Jan. 24, 2023

(54) INFORMATION PROCESSING DEVICE, INFORMATION PROCESSING METHOD, AND PROGRAM

(71) Applicant: Sony Corporation, Tokyo (JP)

(72) Inventor: Suguru Aoki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 39 days.

(21) Appl. No.: 17/265,524

(22) PCT Filed: Jul. 23, 2019

(86) PCT No.: PCT/JP2019/028784
§ 371 (c)(1),
(2) Date: Feb. 3, 2021

(87) PCT Pub. No.: WO2020/036043
PCT Pub. Date: Feb. 20, 2020

(65) Prior Publication Data
US 2021/0227155 A1   Jul. 22, 2021

(30) Foreign Application Priority Data
Aug. 16, 2018   (JP) .............................. JP2018-153171

(51) Int. Cl.
*H04N 5/353*   (2011.01)
*B60R 1/00*   (2022.01)
(Continued)

(52) U.S. Cl.
CPC ............. *H04N 5/3532* (2013.01); *B60R 1/00* (2013.01); *B60R 11/04* (2013.01); *G06V 20/588* (2022.01);
(Continued)

(58) Field of Classification Search
CPC ............. H04N 5/3532; H04N 5/23258; H04N 5/2329; B60R 1/00; B60R 11/04; B60R 2300/302
See application file for complete search history.

(56) References Cited

U.S. PATENT DOCUMENTS

| | | | |
|---|---|---|---|
| 2007/0120997 A1* | 5/2007 | Sasaki .................. | H04N 5/2621 348/E5.046 |
| 2013/0301877 A1* | 11/2013 | Ito ............................. | G06T 7/20 382/103 |
| 2018/0063399 A1 | 3/2018 | Matsuyama | |

FOREIGN PATENT DOCUMENTS

| | | |
|---|---|---|
| CN | 104702826 A | 6/2015 |
| DE | 112016002268 T5 | 2/2018 |

(Continued)

OTHER PUBLICATIONS

International Search Report and Written Opinion dated Oct. 29, 2019, received for PCT Application PCT/JP2019/028784, Filed on Jul. 23, 2019, 11 pages including English Translation.

*Primary Examiner* — Ahmed A Berhan
(74) *Attorney, Agent, or Firm* — Xsensus LLP

(57) ABSTRACT

A motion detecting section detects a change in relative position relation between a subject and an image capturing section performing a rolling shutter operation. A thinning-out setting section sets a thinning-out amount of a line thinning-out operation of the image capturing section according to the detection result obtained by the motion detecting section. A recognition processing section performs subject recognition in an image obtained by the image capturing section, by using a recognizer corresponding to the thinning-out amount set by the thinning-out setting section. The change in relative position relation is detected based on motion of a moving body on which the image capturing section is mounted, an image capturing scene, an (Continued)

image obtained by the image capturing section, and the like. Line thinning-out is performed during the rolling shutter operation, and the thinning-out amount is set according to the detection result obtained by the motion detecting section.

18 Claims, 16 Drawing Sheets

(51) Int. Cl.
*B60R 11/04* (2006.01)
*H04N 5/232* (2006.01)
*G06V 20/56* (2022.01)

(52) U.S. Cl.
CPC ....... *H04N 5/2329* (2013.01); *H04N 5/23258* (2013.01); *B60R 2300/302* (2013.01)

(56) References Cited

FOREIGN PATENT DOCUMENTS

| | | | |
|---|---|---|---|
| JP | 2002209838 A | | 7/2002 |
| JP | 2008060650 A | | 3/2008 |
| JP | 2016-131365 A | | 7/2016 |
| JP | 2018-6828 A | | 1/2018 |
| JP | 2018007077 A | * | 1/2018 |
| WO | WO-2016185691 A1 | | 11/2016 |
| WO | 2017/187811 A1 | | 11/2017 |

* cited by examiner

FIG. 8
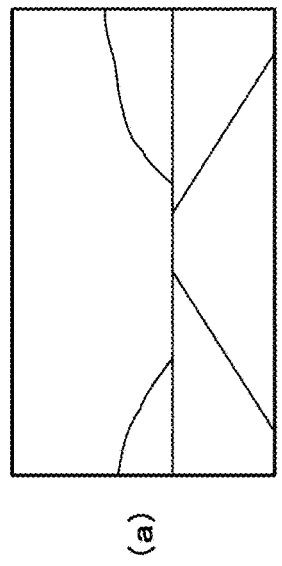
(a)
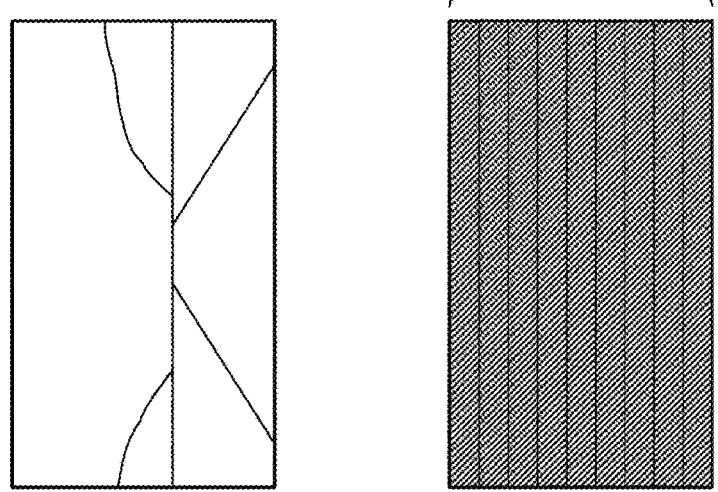
(b)
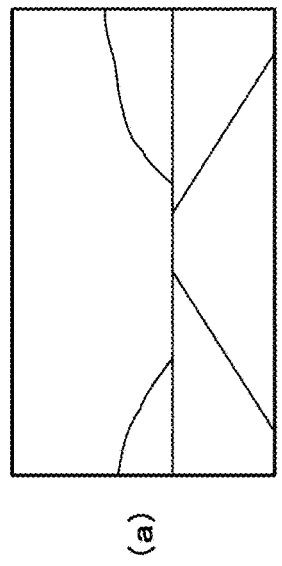
(c)

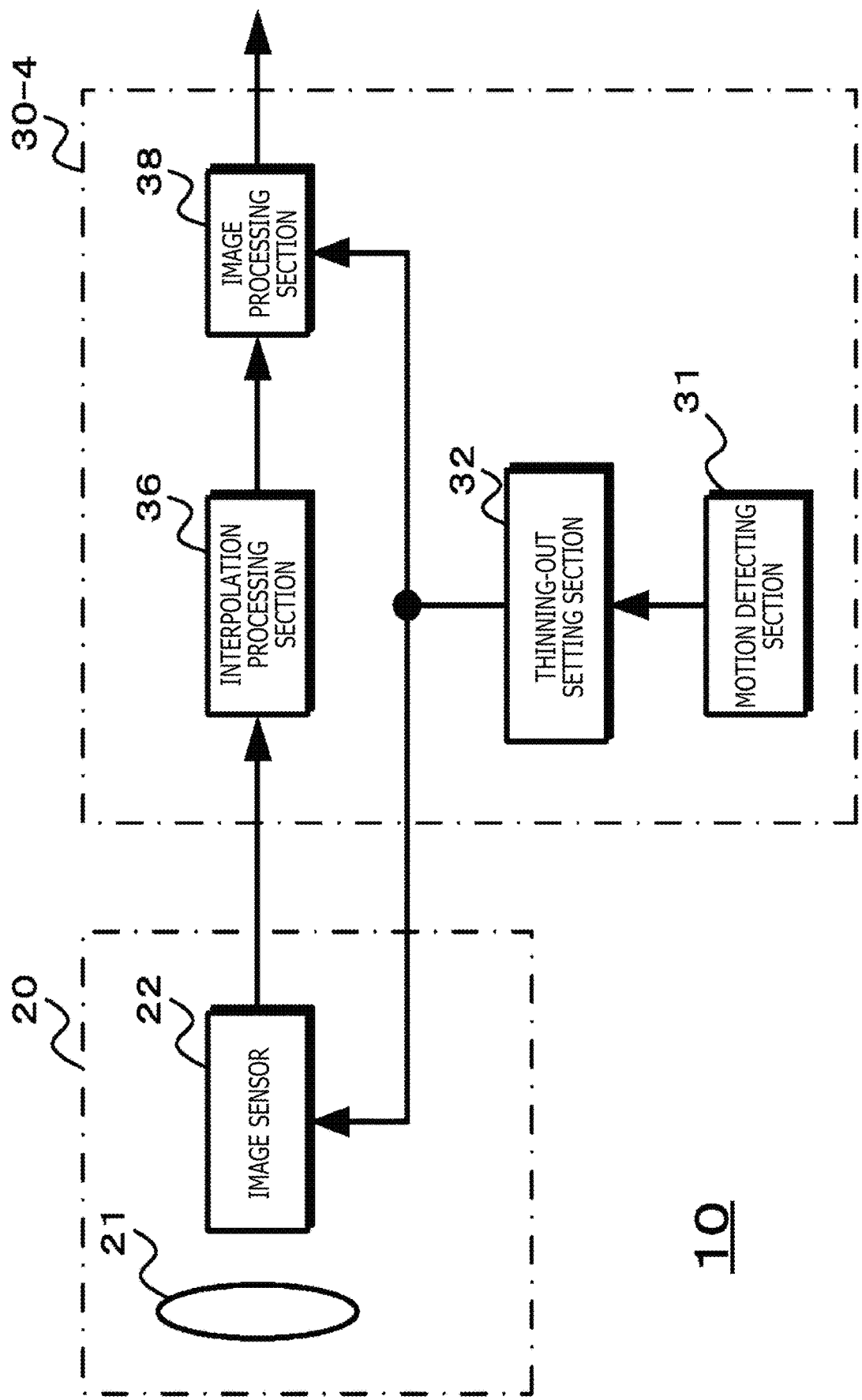

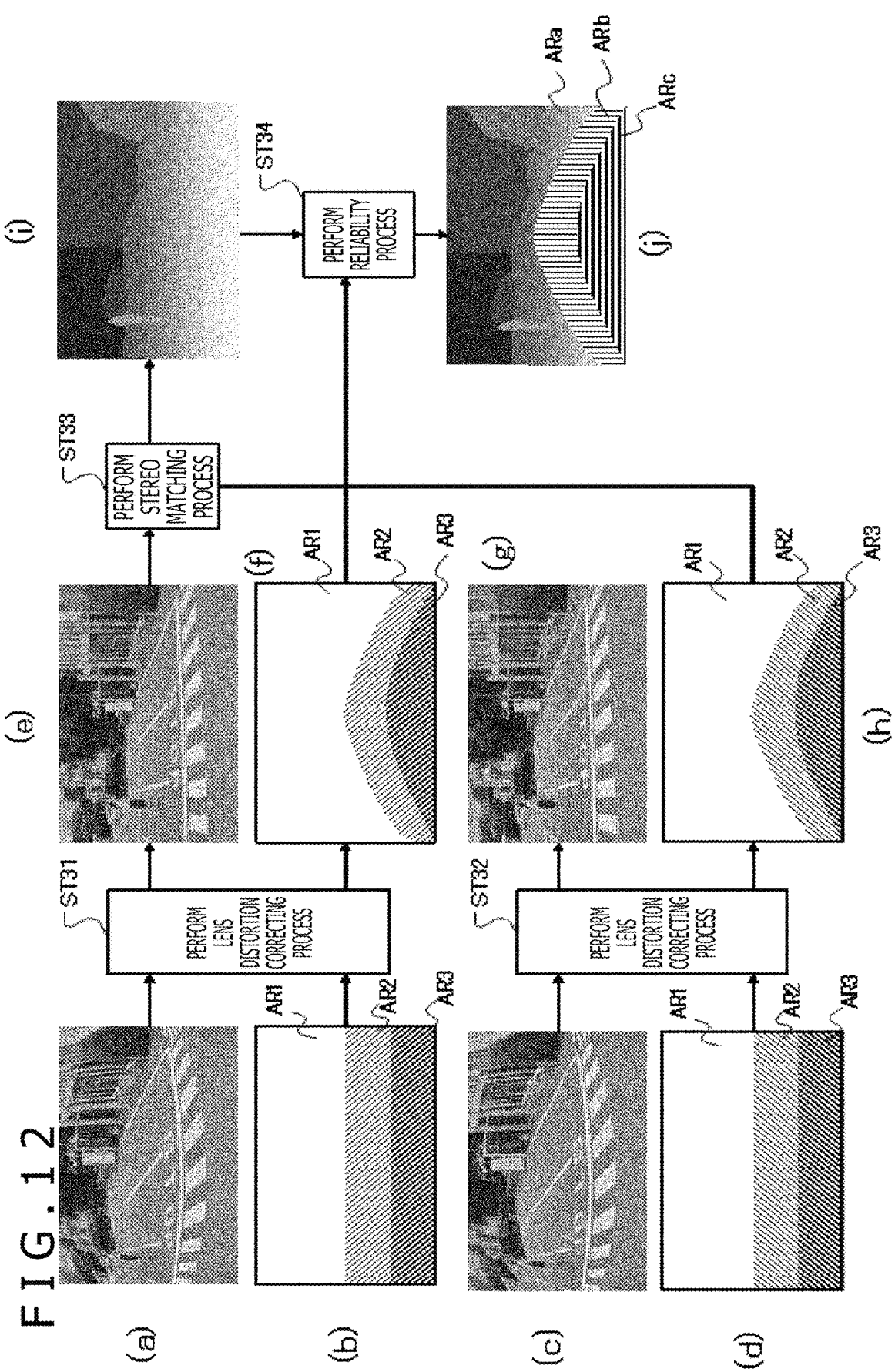

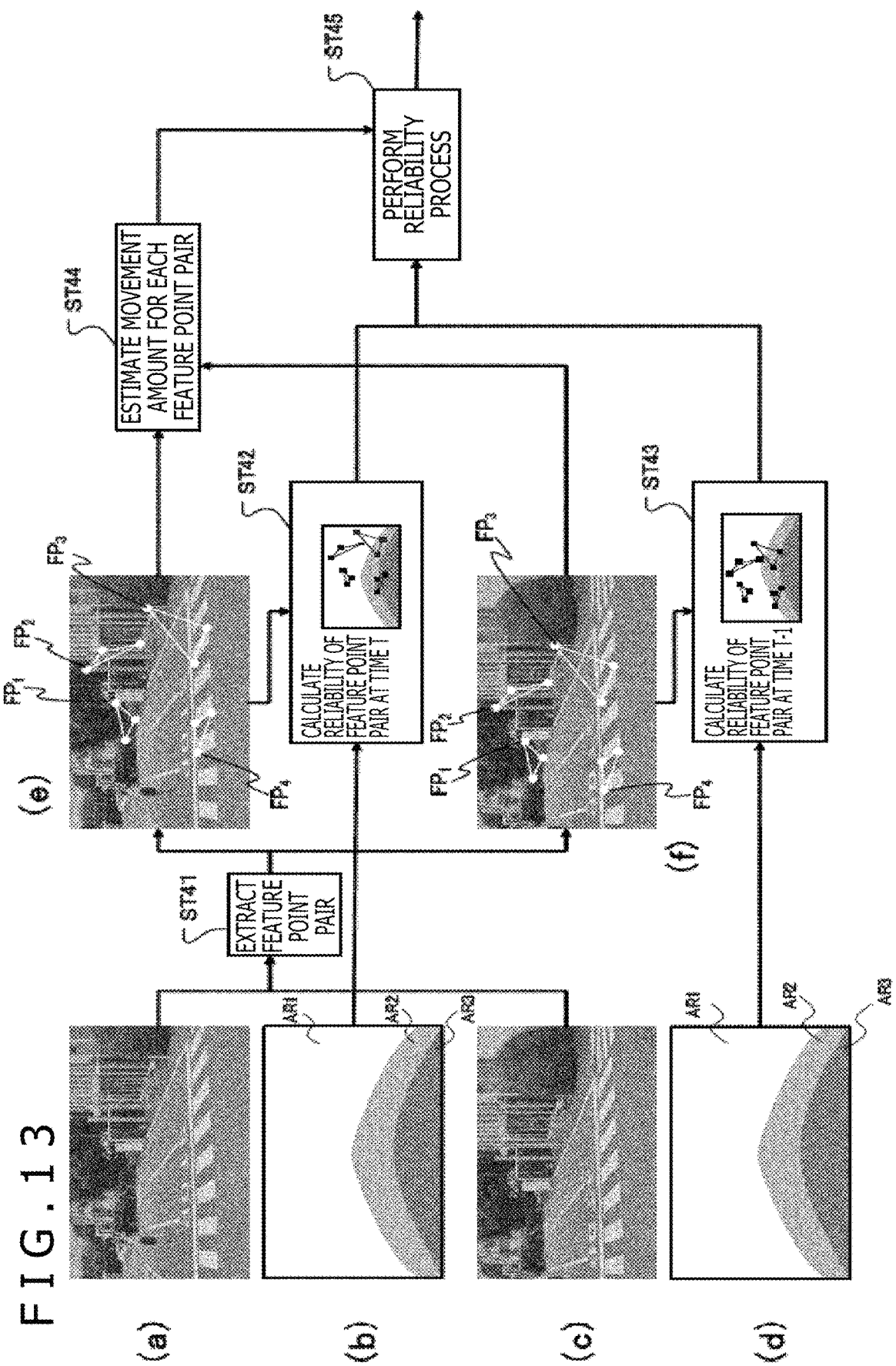

F I G. 1 4
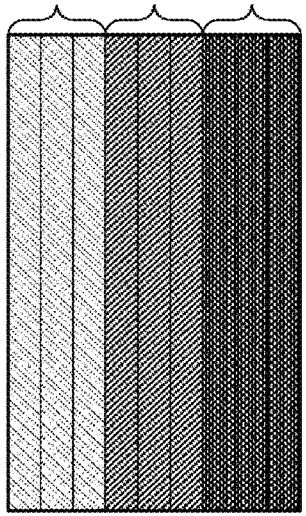
(b)
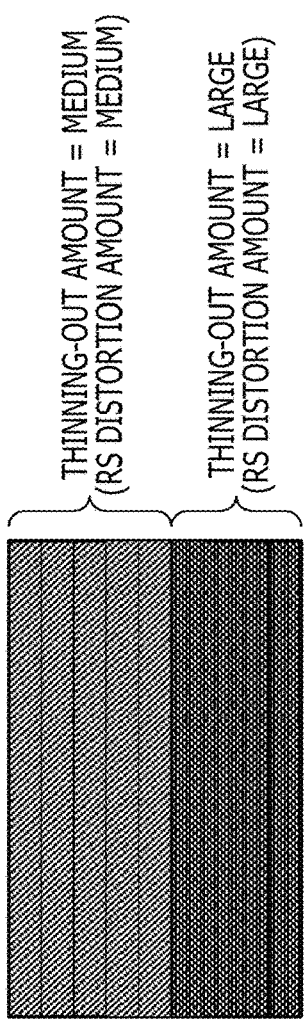
(d)
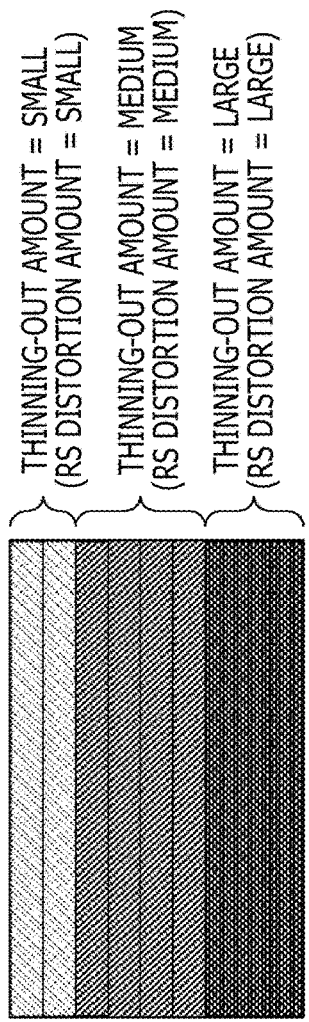
(f)
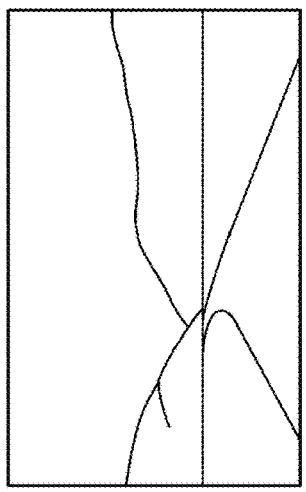
(a)
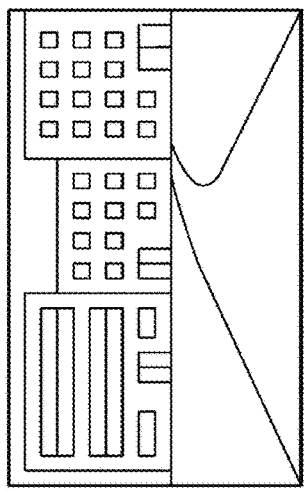
(c)
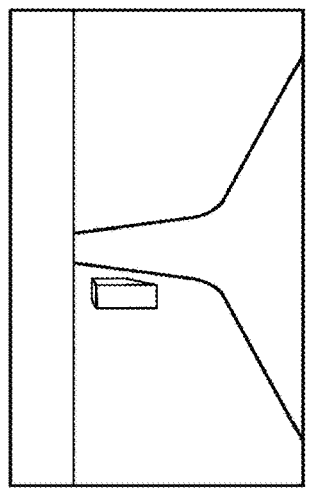
(e)

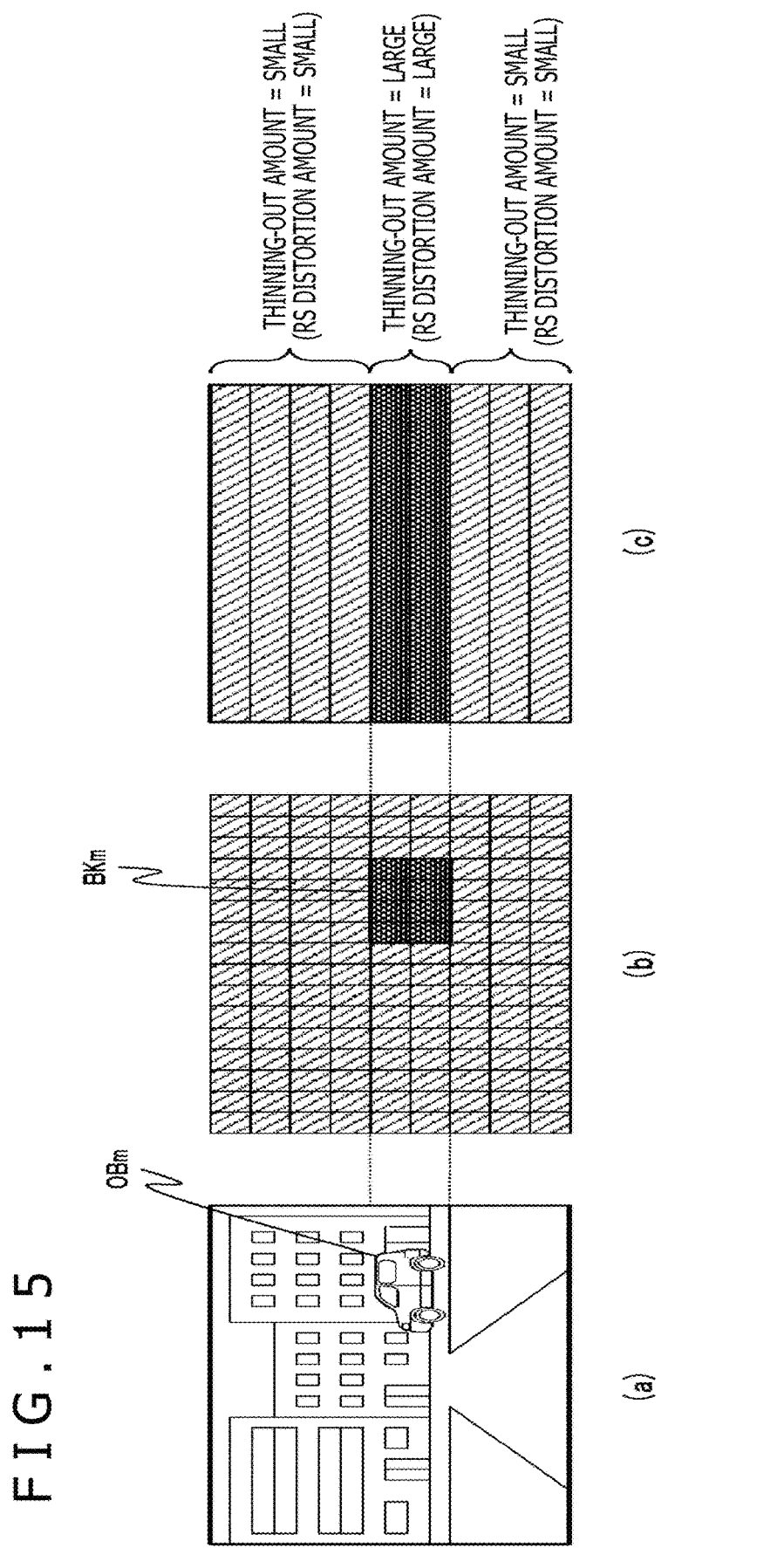

INFORMATION PROCESSING DEVICE, INFORMATION PROCESSING METHOD, AND PROGRAM

CROSS-REFERENCE TO RELATED APPLICATIONS

The present application is based on PCT filing PCT/JP2019/028784, filed Jul. 23, 2019, which claims the priority to JP 2018-153171, filed Aug. 16, 2018, the entire contents of each are incorporated herein by reference.

TECHNICAL FIELD

The present technique relates to an information processing device, an information processing method, and a program, and enables obtainment of a subject image having little distortion.

BACKGROUND ART

Conventionally, when an image of a moving object is captured, a frame rate is increased to improve the visibility. For example, in PTL 1, an image capturing region is sectioned into a target region and a normal region other than the target region, the frame rate of the target region is set to be higher than that of the normal region, and the thinning-out rate of the target region is set to be lower than that of the normal region, so that the visibility of the target region is improved.

CITATION LIST

Patent Literature

[PTL 1]
Japanese Patent Laid-Open No. 2016-131365

SUMMARY

Technical Problem

Meanwhile, in a case where a rolling shutter operation is performed by an image capturing device and in a case where the positional relation between the image capturing device and a subject changes with a lapse of time because exposure to light, reading-out of stored charges, or the like are time-sequentially performed on a line-by-line basis in two-dimensionally arranged pixels, distortion (what is called rolling shutter distortion) occurs in a subject image. Even in a case where a frame rate is increased as disclosed in PTL 1, for example, when the positional relation between an image capturing device and a subject changes greatly, rolling shutter distortion becomes significant.

Therefore, an object of the present technique is to provide an information processing device, an information processing method, and a program by which a subject image having little distortion can be obtained even in a case where the positional relation between an image capturing device and a subject changes with a lapse of time.

Solution to Problem

A first aspect of the present technique is an information processing device including:

a motion detecting section that detects a change in a relative position relation between an image capturing section and a subject; and a thinning-out setting section that sets a thinning-out amount of a line thinning-out operation of the image capturing section according to a detection result obtained by the motion detecting section.

In the technique, the motion detecting section detects the change in the relative position relation between the subject and the image capturing section performing a rolling shutter operation. The motion detecting section detects the change in the relative position relation on the basis of motion of a moving body on which the image capturing section is mounted, an image capturing scene, an image obtained by the image capturing section, and the like. For example, in a case where the moving body is a vehicle, the change in the relative position relation is detected on the basis of a vehicle speed and a steering angle or on the basis of a measurement result obtained by an inertial measurement section that is mounted on the moving body.

The thinning-out setting section increases the thinning-out amount with increase of the change detected by the motion detecting section. In addition, in a case where the change in the relative position relation detected by the motion detecting section has occurred due to rotation of the image capturing section, the thinning-out setting section performs a line thinning-out operation that is uniform all over a screen. Moreover, in a case where the change in the relative position relation detected by the motion detecting section has occurred due to movement of the image capturing section in an optical axis direction, the thinning-out setting section sets a thinning-out amount in a region in which the change in the relative position relation having occurred due to the movement of the image capturing section in the optical axis direction is larger, to be larger than a thinning-out amount in a region in which the change is smaller.

Further, the information processing device includes a reading-out setting section that sets a direction of a line reading-out order in the image capturing section according to the detection result obtained by the motion detecting section. In a case where the change in the relative position relation detected by the motion detecting section has occurred due to forward movement of the image capturing section in the optical axis direction, the reading-out setting section sets the direction of the line reading-out order to be downward, and, in a case where the change has occurred due to rearward movement of the image capturing section in the optical axis direction, the reading-out setting section sets the direction of the line reading-out order to be upward.

Further, the information processing device includes a recognition processing section that performs subject recognition in an image obtained by the image capturing section. The recognition processing section has a recognizer based on a preliminarily generated dictionary and corresponding to a thinning-out amount and performs a recognition process by using a recognizer corresponding to the thinning-out amount set by the thinning-out setting section or a thinning-out amount set for each region. In addition, the recognition processing section performs the recognition process by using a recognizer corresponding to the thinning-out amount set by the thinning-out setting section and corresponding to the direction of the reading-out order set by the reading-out setting section.

Further, the information processing device includes an image processing section that conducts a corresponding-point search by using an image obtained by the image capturing section. The image processing section adjusts a search range according to the thinning-out amount set by the thinning-out setting section, or adjusts reliability of a corresponding point according to the thinning-out amount set by the thinning-out setting section.

A second aspect of the present technique is an information processing method including:

detecting, by a motion detecting section, a change in a relative position relation between an image capturing section and a subject; and setting, by a thinning-out setting section, a thinning-out amount of a line thinning-out operation of the image capturing section according to the detection result obtained by the motion detecting section.

A third aspect of the present technique is a program for causing a computer to control an image capturing section. The program causes the computer to execute:

a procedure of detecting a change in a relative position relation between the image capturing section and a subject; and a procedure of setting a thinning-out amount of a line thinning-out operation of the image capturing section according to the change in the relative position relation.

It is to be noted that the program according to the present technique is a program that can be provided by a recording medium such as an optical disk, a magnetic disk, or a semiconductor memory or a communication medium such as a network, the recording medium and the communication medium being configured to provide the program in a computer readable format to a general-purpose computer that is capable of executing various program codes, for example. When such a program is provided in a computer readable format, processes according to the program are executed on the computer.

Advantageous Effect of Invention

According to the present technique, the thinning-out amount of a line thinning-out operation of an image capturing section is set according to a change in the relative position relation between the image capturing section and a subject. Accordingly, a subject image having little distortion can be obtained. It is to be noted that the effects described in the present description are just examples, and thus are not limitative. In addition, any additional effect may be provided.

BRIEF DESCRIPTION OF DRAWINGS

FIG. 8 depicts diagrams for explaining the relation between a distance to a subject and rolling shutter distortion.

FIG. 11 is a diagram illustrating a configuration according to a fourth embodiment.

FIG. 12 is a diagram for explaining reliability in a case of acquiring a depth map.

FIG. 13 is a diagram for explaining reliability in SLAM.

FIG. 14 illustrates the relation between a scene presumption result and a thinning-out amount.

FIG. 15 illustrates a case where a moving object is included in a captured image.

DESCRIPTION OF EMBODIMENTS

Hereinafter, explanations of modes for carrying out the present technique will be given. The explanations will be given in the following order.

Figure 1:
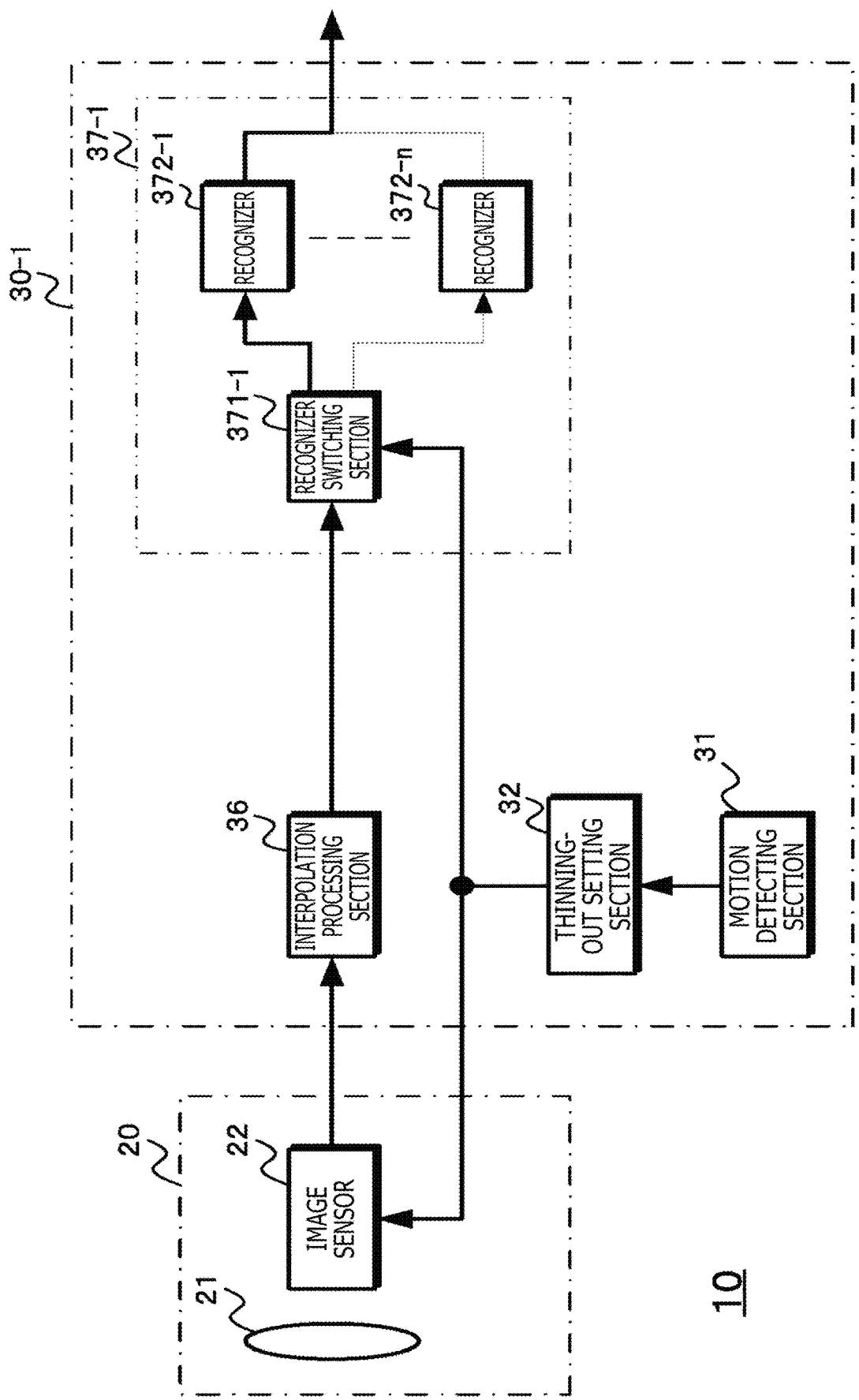
FIG. 1 is a diagram illustrating a configuration according to a first embodiment.

1. First Embodiment
1-1. Configuration According to First Embodiment
1-2. Operation According to First Embodiment
2. Second Embodiment
2-1. Configuration According to Second Embodiment
2-2. Operation According to Second Embodiment
3. Third Embodiment
3-1. Configuration According to Third Embodiment
3-2. Operation According to Third Embodiment
4. Fourth Embodiment
4-1. Configuration According to Fourth Embodiment
4-2. Operation According to Fourth Embodiment
5. Modifications
6. Application Example 1. First Embodiment 1-1. Configuration According to First Embodiment FIG. 1 illustrates a configuration according to a first embodiment. An image capturing system 10 includes an image capturing section 20 and a signal processing section 30-1.

The image capturing section 20 includes an image capturing lens 21 and an image sensor 22. The image capturing lens 21 of the image capturing section 20 is formed by using a focus lens, a zoom lens, or the like and forms an optical image of a subject on an image capturing surface of the image sensor 22.

The image sensor 22 is formed by using a CMOS (Complementary Metal Oxide Semiconductor) image sensor, for example. The image sensor 22 performs a rolling shutter operation to generate an image signal according to the optical image of the subject and outputs the image signal to the signal processing section 30-1. Further, the image sensor 22 performs line thinning-out by a thinning-out amount indicated by a thinning-out setting signal from a thinning-out setting section 32 which will be described later, and generates an image signal. It is to be noted that a thinning-out rate may be used in place of the thinning-out amount, but the thinning-out amount is used in the following explanation.

The signal processing section 30-1 performs subject recognition on the basis of the image signal generated by the image capturing section 20. The signal processing section 30-1 includes a motion detecting section 31, the thinning-out setting section 32, an interpolation processing section 36, and a recognition processing section 37-1.

The motion detecting section 31 detects motion of the image capturing section 20. For example, in a case where the image capturing system 10 is mounted on a moving body such as a vehicle, the motion detecting section 31 detects the straight traveling speed and the angular velocity of the image capturing section 20 on the basis of a vehicle speed and a handle steering angle. The motion detecting section 31 outputs the motion detection result to the thinning-out setting section 32.

The thinning-out setting section 32 sets a thinning-out amount according to the motion detected by the motion detecting section 31. The thinning-out setting section 32 calculates a thinning-out amount Dt according to the formula (1) using a speed VS in a straight travel direction and a speed VR in a rotation direction, for example. It is to be noted that "ka" and "kb" are preset coefficients. The thinning-out setting section 32 outputs a thinning-out setting signal indicating the set thinning-out amount to the recognition processing section 37-1.

$$Dt = ka \times VS + kb \times VR \quad (1)$$

The interpolation processing section 36 performs an interpolation process by using the image signal outputted from the image capturing section 20 and generates an image signal of an interpolated image having lines the number of which is equal to that in the image before the thinning out, for example. The interpolation processing section 36 outputs the image signal after the interpolation process to the recognition processing section 37-1. It is to be noted that, in a case where thinning-out information indicating the state of thinning out is supplied from the image capturing section 20, the interpolation processing section 36 may perform the interpolation process on the basis of the thinning-out information or may perform the interpolation process on the basis of the thinning-out setting signal generated by the thinning-out setting section 32.

The recognition processing section 37-1 includes a recognizer switching section 371-1 and a plurality of recognizers 372-1 to 372-n. The recognizers 372-1 to 372-n are provided to correspond to thinning-out amounts. For example, the recognizer 372-1 preliminarily stores a dictionary that is based on a learning image obtained by an interpolation process of an image captured by a thinning-out amount Dt-1, and performs a recognition process by using the dictionary. In addition, the recognizer 372-n preliminarily stores a dictionary that is based on a learning image captured by a thinning-out amount Dt-n, and performs a recognition process by using the dictionary. The recognizer switching section 371 detects a processed region on the basis of the image signal generated by the image capturing section 20. Further, the recognizer switching section 371 switches a recognizer to be used for a subject recognition process, according to the thinning-out amount in the processed region. The recognizer switching section 371 supplies the image signal to a recognizer 372-x selected as a result of the switching and recognizes a subject in the processed region by using a dictionary corresponding to the thinning-out amount, and then, the recognition result is outputted from the signal processing section 30-1.

1-2. Operation According to First Embodiment

Figure 2:
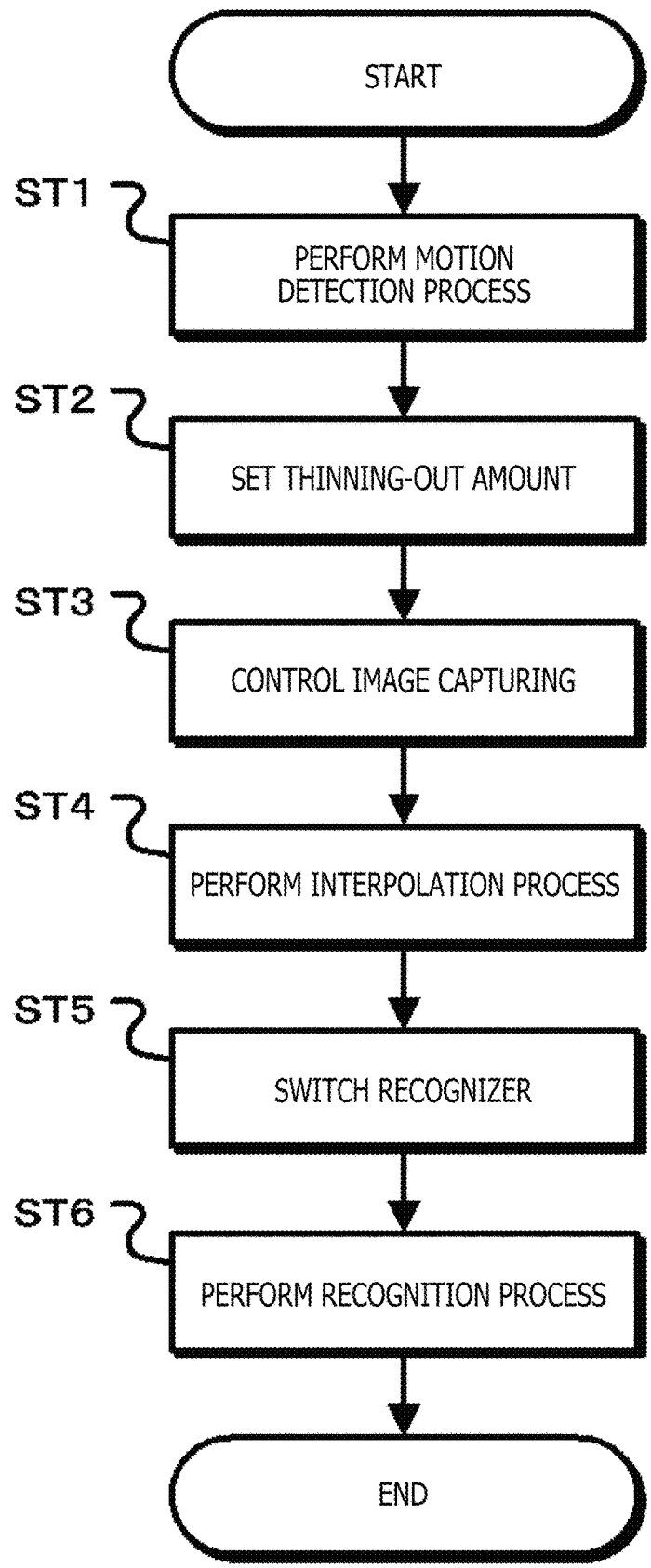
FIG. 2 is a flowchart of an operation according to the first embodiment.

FIG. 2 is a flowchart of an operation according to the first embodiment. In step ST1, the signal processing section 30-1 performs a motion detection process. The signal processing section 30-1 detects motion in a straight travel direction or in a rotation direction. For example, in a case where the image capturing system 10 is mounted on an automobile, the signal processing section 30-1 obtains, as a motion detection result, the speed of the automobile or the steering angle of a steering wheel. Then, the step proceeds to step ST2.

In step ST2, the signal processing section 30-1 sets a thinning-out amount. The signal processing section 30-1 sets a thinning-out amount on the basis of the motion detected in step ST1 according to the above formula (1), for example. Then, the step proceeds to step ST3.

In step ST3, the signal processing section 30-1 controls image capturing. The signal processing section 30-1 generates a thinning-out setting signal indicating the thinning-out amount set in step ST2 and outputs the thinning-out setting signal to the image capturing section 20. Accordingly, the image capturing section 20 generates an image signal of a thinned-out image in which line thinning-out has been performed by the thinning-out amount set in step ST2. Then, the step proceeds to step ST4.

In step ST4, the signal processing section 30-1 performs an interpolation process. The signal processing section 30-1 performs the interpolation process by using the image signal of the thinned-out image generated by the image capturing section 20 and generates an image signal of an interpolated image having lines the number of which is equal to that before the line thinning-out. Then, the step proceeds to step ST5.

In step ST5, the signal processing section 30-1 switches a recognizer. The signal processing section 30-1 performs switching to a recognizer that corresponds to the thinning-out amount set in step ST2, as a recognizer for performing subject recognition by using the image signal of the interpolated image. Then, the step proceeds to step ST6.

In step ST6, the signal processing section 30-1 performs a recognition process. By using the image signal of the interpolated image generated in step ST4, the signal processing section 30-1 recognizes a subject with the recognizer selected as a result of the switching in step ST5.

Figure 3:
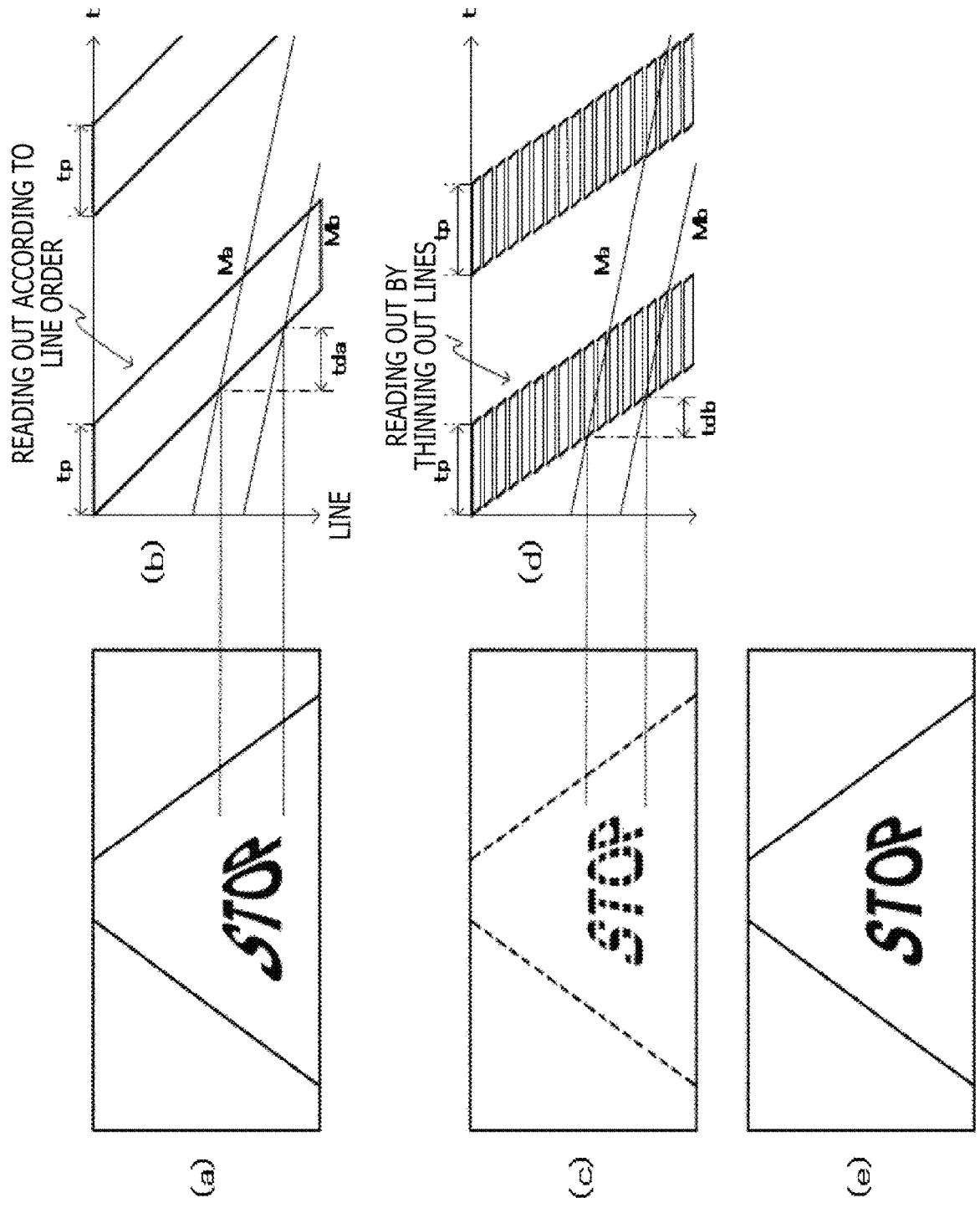
FIG. 3 depicts diagrams of operation examples according to the first embodiment.

FIG. 3 depicts operation examples according to the first embodiment. It is to be noted that a subject is a "STOP" mark on a road, for example, and the image capturing section 20 is mounted on a vehicle and is moving forward. In addition, an exposure time period of each line is a time period tp, the direction of a line reading-out order is set to be downward from the upper side, and the leading end and the rear end of the subject in a captured image are a line position Ma and a line position Mb, respectively.

In FIG. 3, (a) illustrates an image obtained by the image capturing section 20 in a case where thinning out is not performed. In this case, reading out is performed in a line order. Thus, the line positions Ma and Mb move toward the front side (a downward direction in the captured image) with lapse of time. Therefore, as illustrated in (b) in FIG. 3, the distance between the line position Ma and the line position Mb becomes larger according to the moving speed of the vehicle in the period of the time difference tda. That is, the subject is expanded as illustrated in (a) in FIG. 3.

In FIG. 3, (c) illustrates a thinned-out image obtained by the image capturing section 20 in a case where thinning out is performed. The line positions Ma and Mb move toward the front side (a downward direction in the captured image) with lapse of time. In addition, a time required to read out the first line to the last line is shortened because line thinning-out reading out is performed. Thus, as illustrated in (d) in FIG. 3, a time difference tdb which is the distance between the line position Ma and the line position Mb is shorter than the time difference tda in the case where thinning out is not performed. Therefore, as depicted in (e) in FIG. 3, an interpolated image obtained by performing an interpolation process on the thinned-out image depicted in (c) in FIG. 3 has less subject distortion than that in the case where thinning out is not performed. Further, when the thinning-out amount is set to be larger with increase of the forward movement speed of the vehicle, the subject distortion can be reduced.

Further, an interpolation process is performed on the captured image obtained by performing thinning out, and a subject recognition process is performed by using the interpolated image with a recognizer corresponding to the thinning-out amount. Therefore, the subject can be recognized with precision.

As explained so far, according to the first embodiment, a thinning-out amount is set according to the relative position change between the image capturing section and a subject, so that a captured image having little rolling shutter distortion is obtained. Further, since a recognizer that corresponds to the thinning-out amount in the captured image thus obtained is used, the subject can be recognized with precision on the basis of the captured image having little rolling shutter distortion.

2. Second Embodiment

Figure 4:
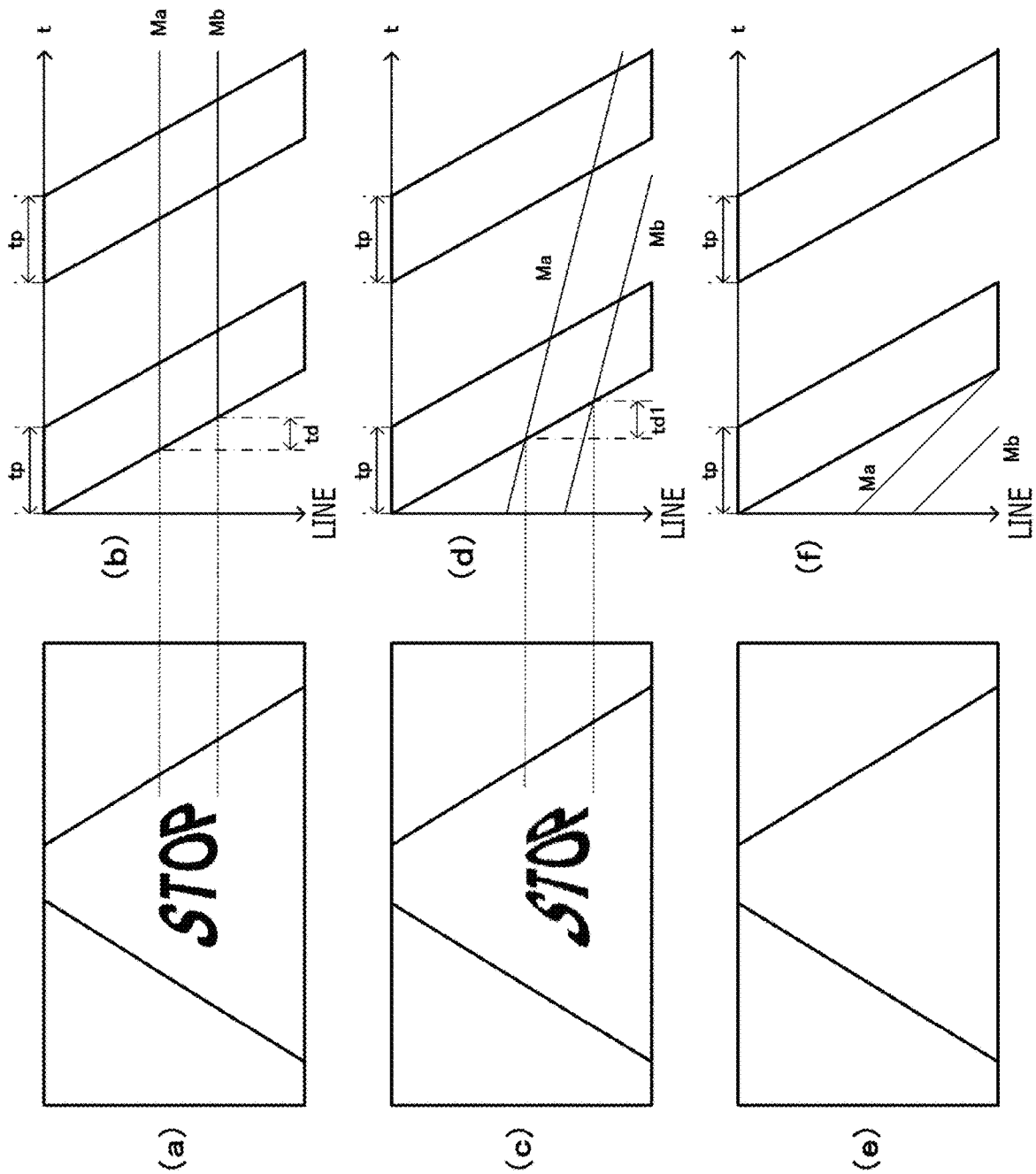
FIG. 4 depicts diagrams of a case where an image capturing section is moving forward with respect to a subject.
Figure 5:
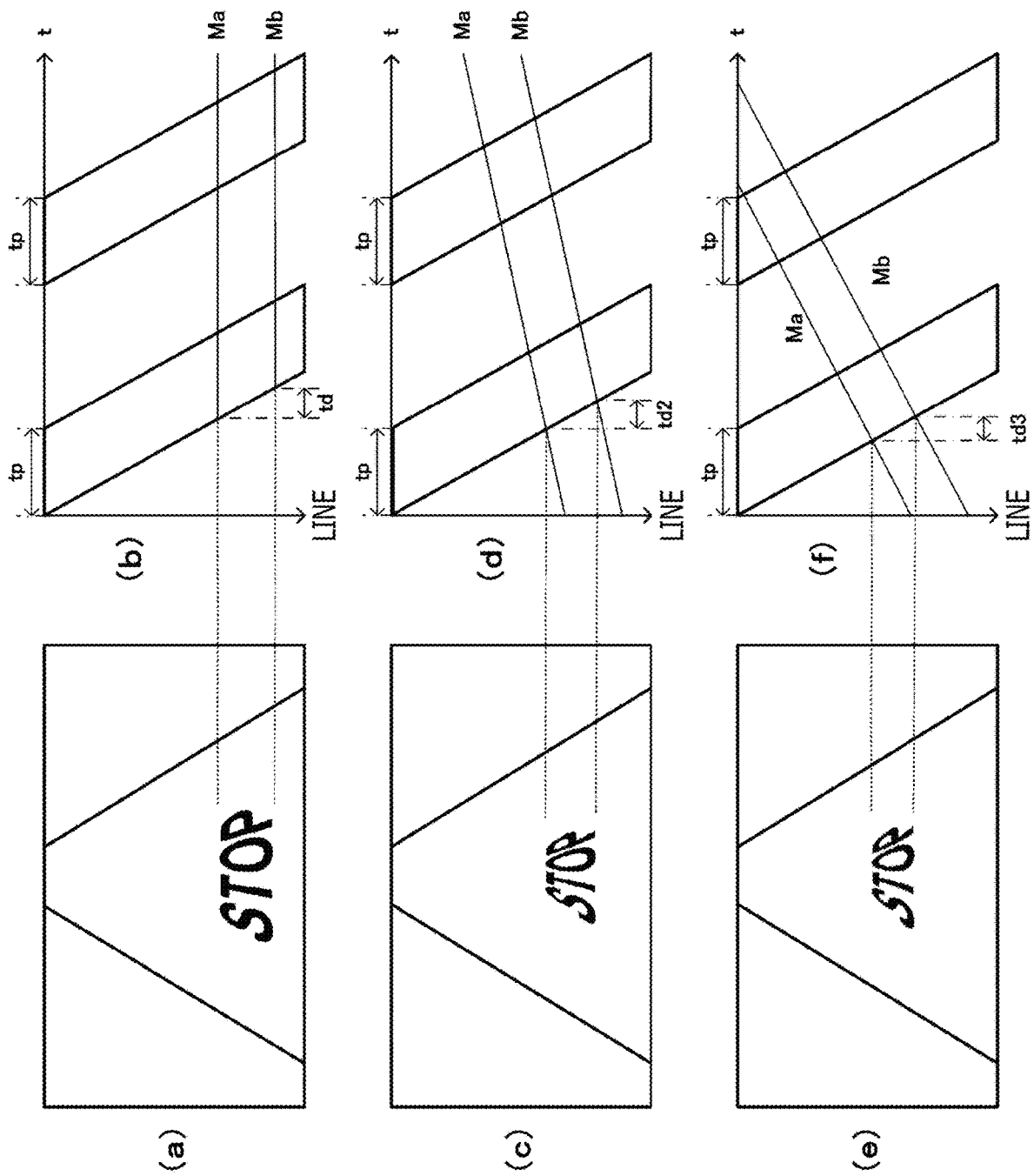
FIG. 5 depicts diagrams of a case where the image capturing section is moving rearward with respect to the subject.

Meanwhile, in a captured image obtained while a rolling shutter operation is performed, a subject is enlarged or compressed according to motion of the subject in a direction orthogonal to a line direction of an image sensor which is used in the image capturing section 20. FIG. 4 depicts diagrams of the case where the image capturing section is moving forward with respect to the subject. FIG. 5 depicts diagrams of a case where the image capturing section is moving rearward with respect to the subject. It is to be noted that the subject is a "STOP" mark on a road, for example, and the image capturing section 20 is mounted on a vehicle. In addition, in FIGS. 4 and 5, an exposure time period of each line is a time period tp, the direction of a line reading-out order is set to be downward from the upper side, and the leading end and the read end of the subject in a captured image are a line position Ma and a line position Mb, respectively. Also, FIG. 4 illustrates the case where the vehicle is moving forward with respect to the subject, and motion of the subject in a captured image is in the direction of the line reading-out order. FIG. 5 illustrates a case where the vehicle is moving rearward with respect to the subject, and motion of the subject in a captured image is in a direction opposite to the direction of the line reading-out order.

Images in a case where the vehicle is stopped are illustrated in (a) and (b) in FIG. 4 and (a) and (b) in FIG. 5. Since the vehicle is stopped, the line positions Ma and Mb are fixed, irrespective of lapse of time. In addition, due to a rolling shutter operation, there is a time difference td in start timing of the exposure time period between the line position Mb and the line position Mb.

The case where the vehicle is moving forward is illustrated in (c) and (d) in FIG. 4. In this case, the line positions Ma and Mb move toward the front side (a downward direction in the captured image) with lapse of time. Therefore, as illustrated in (d) in FIG. 4, the time difference td1 between the line position Ma and the line position Mb becomes larger according to the moving speed of the vehicle than that when the vehicle is stopped. That is, as illustrated in (c) in FIG. 4, the subject is expanded.

The case where the vehicle is moving forward at high speed is illustrated in (e) and (f) in FIG. 4. Also in this case, the line positions Ma and Mb move toward the front side (a downward direction in the captured image) with lapse of time. In addition, the movement amount is large because the speed of the vehicle is high. Therefore, the line position Ma and the line position Mb are deviated from the image capturing range before the exposure time period comes, as illustrated in (f) in FIG. 4, and the subject is not displayed as illustrated in (e) in FIG. 4.

The case where the vehicle is moving rearward is illustrated in (c) and (d) in FIG. 5. In this case, the line positions Ma and Mb move toward the depth side (the direction of the line positions of a horizontal line in the captured image) with lapse of time. Therefore, as illustrated in (d) in FIG. 5, the time difference td2 between the line position Ma and the line position Mb becomes smaller according to the moving speed of the vehicle, than that when the vehicle is stopped. That is, the subject is compressed as illustrated in (c) in FIG. 5.

In FIG. 5, (e) and (f) illustrate a case where the vehicle is moving rearward at high speed. Also in this case, the line positions Ma and Mb move toward the depth side (the direction of the line positions of a horizontal line in the captured image) with lapse of time. Further, the movement amount is large because the speed of the vehicle is high. Therefore, as illustrated in (f) in FIG. 5, the time difference td3 between the line position Ma and the line position Mb is smaller than the time difference td2. That is, as illustrated in (e) in FIG. 5, the subject is further compressed than that illustrated in (c) in FIG. 5.

As explained so far, when the subject moves at high speed in the direction of the line reading-out order, the subject is not included in a captured image. However, in a case where the subject moves in a direction opposite to the direction of the reading-out order, the subject is necessarily included in a captured image even when the subject moves at high speed.

Therefore, in the second embodiment, in a case where a signal is read out from an image sensor of the image capturing section 20 on a line-by-line basis, the direction of a line reading-out order is set to be downward from the upper side or to be upward from the lower side on the basis of the motion detection result such that a subject is prevented from missing in a thinned-out image.

2-1. Configuration According to Second Embodiment

Figure 6:
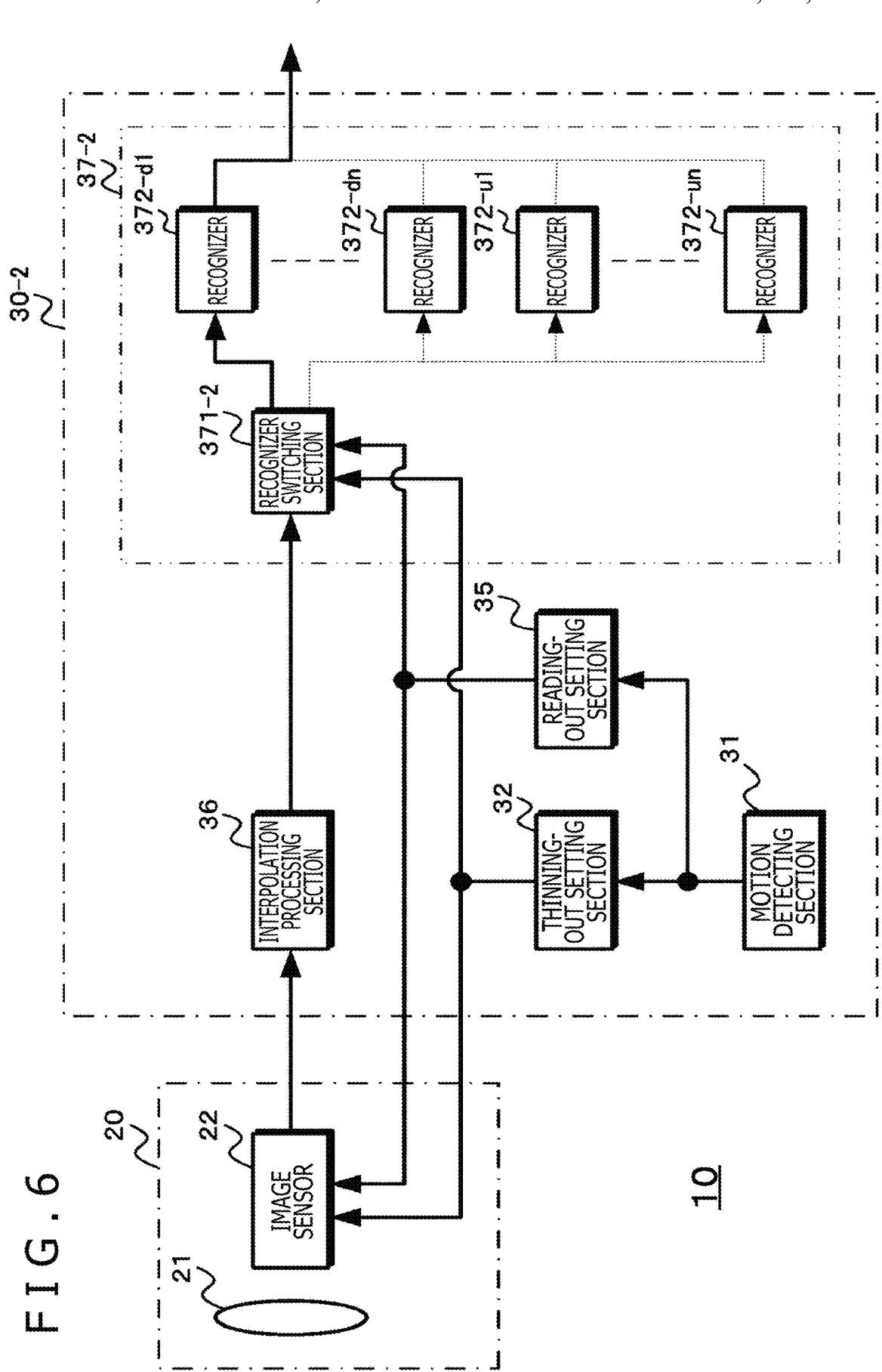
FIG. 6 is a diagram illustrating a configuration according to a second embodiment.

FIG. 6 illustrates a configuration according to the second embodiment. The image capturing system 10 includes the image capturing lens 21, the image capturing section 20, and a signal processing section 30-2.

The image capturing section 20 includes the image capturing lens 21 and the image sensor 22. The image capturing lens 21 of the image capturing section 20 is formed by using a focus lens, a zoom lens, or the like and forms an optical image of a subject on an image capturing surface of the image sensor 22.

The image sensor 22 is formed by using a CMOS (Complementary Metal Oxide Semiconductor) image sensor, for example. The image sensor 22 performs a rolling shutter operation to generate an image signal according to the optical image of the subject and outputs the image signal to the signal processing section 30-2. Further, the image sensor 22 sets, as the direction of a line reading-out order, a direction indicated by a reading-out order direction signal from a reading-out setting section 35 which will be described later, performs line thinning-out by a thinning-out amount indicated by a thinning-out setting signal from the thinning-out setting section 32 which will be described later, and generates an image signal.

The signal processing section 30-2 performs subject recognition on the basis of the image signal generated by the image capturing section 20. The signal processing section 30-2 includes the motion detecting section 31, the thinning-out setting section 32, the reading-out setting section 35, the interpolation processing section 36, and a recognition processing section 37-2.

The motion detecting section 31 detects motion of the image capturing section 20. For example, in a case where the image capturing system 10 is mounted on a moving body such as a vehicle, the motion detecting section 31 detects the straight traveling speed and the angular velocity of the image capturing section 20 on the basis of a vehicle speed and a handle steering angle. The motion detecting section 31 outputs the motion detection result to the thinning-out setting section 32.

The thinning-out setting section 32 sets a thinning-out amount according to the motion detected by the motion detecting section 31. The thinning-out setting section 32 calculates a thinning-out amount Dt according to the above formula (1) using a speed VS in a straight travel direction and a speed VR in a rotation direction, for example. The thinning-out setting section 32 outputs a thinning-out setting signal indicating the set thinning-out amount to the recognition processing section 37-2.

The reading-out setting section 35 sets the direction of a line reading-out order in the image capturing section 20 according to the motion detected by the motion detecting section 31. In a case where the image capturing section 20 is determined to be moving forward, the reading-out setting section 35 sets the direction of the line reading-out order to be upward from the lower side. In addition, in a case where the image capturing section 20 is determined to be moving rearward, the reading-out setting section 35 sets the direction of the line reading-out order to be downward from the upper side. The reading-out setting section 35 generates an order direction setting signal indicating the set direction of the reading-out order and outputs the order direction setting signal to the image capturing section 20 and the recognition processing section 37-2.

The interpolation processing section 36 performs an interpolation process by using the image signal outputted from the image capturing section 20 and generates an image signal of an interpolated image having lines the number of which is equal to that in the image before the thinning out, for example. The interpolation processing section 36 outputs the image signal after the interpolation process to the recognition processing section 37-2. It is to be noted that, in a case where thinning-out information indicating the state of thinning out is supplied from the image capturing section 20, the interpolation processing section 36 may perform the interpolation process on the basis of the thinning-out information or may perform the interpolation process on the basis of the thinning-out setting signal generated by the thinning-out setting section 32.

The recognition processing section 37-2 includes a recognizer switching section 371-2 and a plurality of recognizers 372-$d1$ to 372-$dn$ and 372-$u1$ to 372-$un$. It is to be noted that the recognizers 372-$d1$ to 372-$dn$ are provided to correspond to thinning-out amounts when the direction of the line reading-out order is set to be downward from the upper side, while the recognizers 372-$u1$ to 372-$un$ are provided to correspond to thinning-out amounts when the direction of the reading-out order is set to be upward from the lower side. For example, the recognizer 372-$d1$ preliminarily stores a dictionary that is based on a learning image obtained by an interpolation process of an image captured by a thinning-out amount Dt-d1 when the direction of the reading-out order is set to be downward from the upper side, and performs a recognition process by using the dictionary. In addition, the recognizer 372-$un$ preliminarily stores a dictionary that is based on a learning image obtained by an interpolation process of an image captured by a thinning-out amount Dt-un when the direction of the reading-out order is set to be upward from the lower side, and performs a recognition process by using the dictionary.

The recognizer switching section 371-2 detects a processed region on the basis of the image signal generated by the image capturing section 20. Further, the recognizer switching section 371-2 switches a recognizer to be used for a subject recognition process, according to the thinning-out amount in the processed region and the direction of the reading-out order set by the reading-out setting section 35. The recognizer switching section 371-2 supplies the image signal to the recognizer 372-$x$ selected as a result of the switching and recognizes a subject in the processed region, and then, the recognition result is outputted from the signal processing section 30-2.

2-2. Operation According to Second Embodiment

Figure 7:
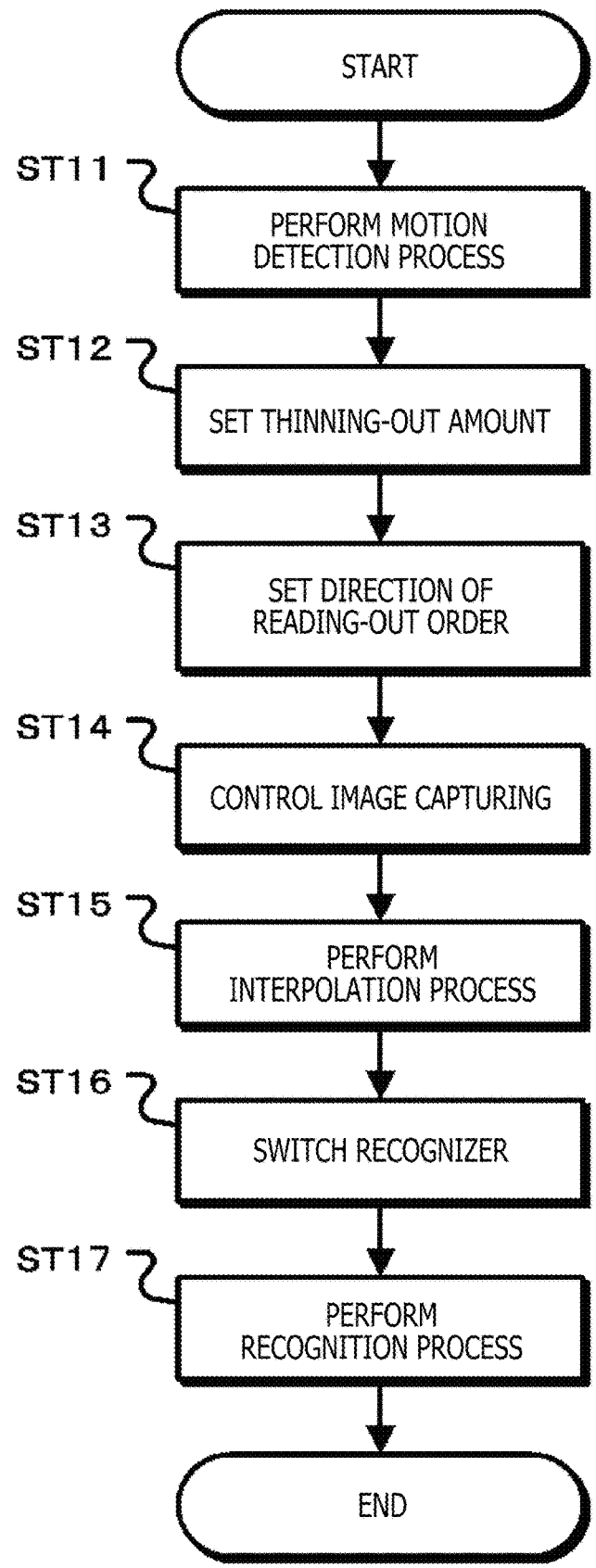
FIG. 7 is a flowchart of an operation according to the second embodiment.

FIG. 7 illustrates a flowchart of an operation according to the second embodiment. In step ST11, the signal processing section 30-2 performs a motion detection process. The signal processing section 30-2 detects motion in a straight travel direction or in a rotation direction. For example, in a case where the image capturing system 10 is mounted on an automobile, the signal processing section 30-2 obtains, as a motion detection result, the speed of the automobile or the steering angle of a steering wheel. Then, the step proceeds to step ST12.

In step ST12, the signal processing section 30-2 sets a thinning-out amount. The signal processing section 30-2 sets a thinning-out amount on the basis of the motion detected in step ST11 according to the above formula (1), for example. Then, the step proceeds to step ST13.

In step ST13, the signal processing section 30-2 sets the direction of a reading-out order. The signal processing section 30-2 sets the direction of the line reading-out order to be downward from the upper side or to be upward from the lower side on the basis of the motion detected in step ST11. Then, the step proceeds to step ST14.

In step ST14, the signal processing section 30-2 controls image capturing. The signal processing section 30-2 generates a thinning-out setting signal indicating the thinning-out amount set in step ST2 and an order direction setting signal indicating the direction of the reading-out order set in step ST13. The signal processing section 30-2 outputs the generated thinning-out setting signal and the generated order direction setting signal to the image capturing section 20. Accordingly, the image capturing section 20 generates an image signal of a thinned-out image in which line thinning-out has been performed in the direction of the reading-out order set in step ST13 by the thinning-out amount set in step ST12. Then, the step proceeds to step ST15.

In step ST15, the signal processing section 30-2 performs an interpolation process. The signal processing section 30-2 performs the interpolation process by using the image signal of the thinned-out image generated by the image capturing section 20 and generates an image signal of the interpolated image having lines the number of which is equal to that before the line thinning-out. Then, the step proceeds to step ST16.

In step ST16, the signal processing section 30-2 switches a recognizer. The signal processing section 30-2 performs switching to a recognizer that corresponds to the thinning-out amount set in step ST12 and the direction of the reading-out order set in step ST13, as a recognizer for performing subject recognition by using the image signal of the interpolated image. Then, the step proceeds to step ST17.

In step ST17, the signal processing section 30-2 performs a recognition process. By using the image signal of the interpolated image generated in step ST15, the signal processing section 30-2 performs a subject recognition process with the recognizer selected as a result of the switching in step ST16.

As explained so far, according to the second embodiment, a thinning-out amount and the direction of a line reading-out order are set according to a change in the relative positions between the image capturing section and a subject, so that a captured image which has little rolling shutter distortion and in which a subject is prevented from missing can be obtained. Further, since a recognizer that corresponds to the thinning-out amount and the order of the reading-out order in the captured image thus obtained is used, the subject can be recognized with precision on the basis of the captured image having little rolling shutter distortion.

3. Third Embodiment

In a captured image obtained while a rolling shutter operation is performed, the degree of distortion varies according to motion of a subject or the distance to a subject. FIG. 8 depicts diagrams for explaining the relation between the distance to a subject and rolling shutter distortion. As depicted in (a) in FIG. 8, in a case where a subject in an image capturing region is still, the moving speed of the subject in the image capturing region when the image capturing section moves straight forward becomes higher as the distance to the subject becomes shorter. Therefore, as depicted in (b) in FIG. 8, a distortion amount (RS distortion amount) due to a rolling shutter operation is large for a subject at a near distance, and an RS distortion amount is small for a subject at a long distance. For example, in a case where the image capturing system is mounted on a vehicle, the RS distortion amount of a road surface or the like located in a lower-side region of an image capturing region is larger than that of a subject in an upper-side region. In addition, when the image capturing section moves in a rotation direction, the RS distortion amount is fixed in every region in a captured image, as depicted in (c) in FIG. 8.

Therefore, in the third embodiment, a thinning-out amount is set for each region such that a subject can be recognized with precision.

3-1. Configuration According to Third Embodiment

Figure 9:
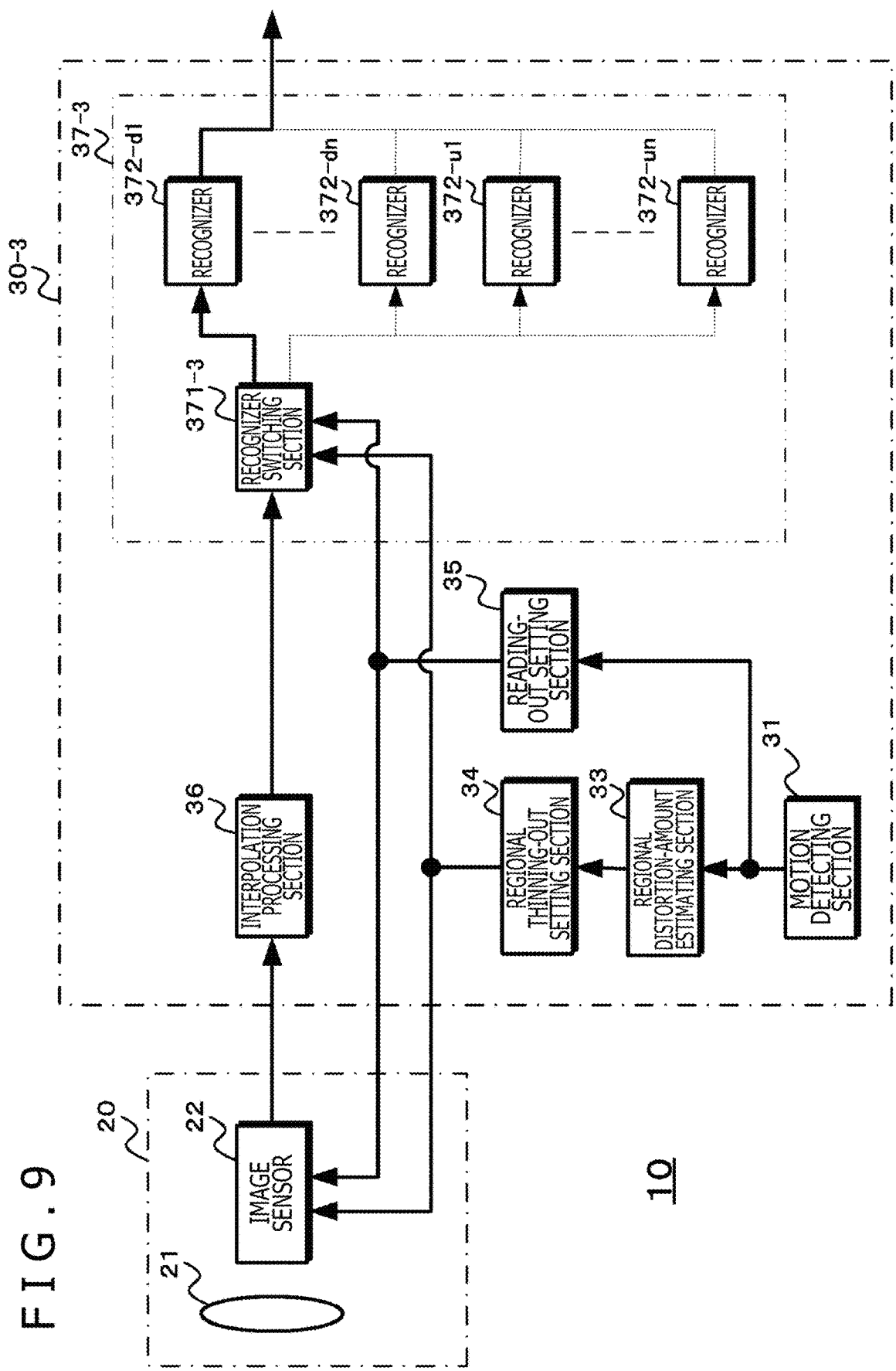
FIG. 9 is a diagram illustrating a configuration according to a third embodiment.

FIG. 9 illustrates a configuration according to the third embodiment. The image capturing system 10 includes the image capturing lens 21, the image capturing section 20, and a signal processing section 30-3.

The image capturing section 20 includes the image capturing lens 21 and the image sensor 22. The image capturing lens 21 of the image capturing section 20 is formed by using a focus lens, a zoom lens, or the like and forms an optical image of a subject on an image capturing surface of the image sensor 22.

The image sensor 22 is formed by using a CMOS (Complementary Metal Oxide Semiconductor) image sensor, for example. The image sensor 22 performs a rolling shutter operation to generate an image signal according to the optical image of the subject and outputs the image signal to the signal processing section 30-1. Further, the image sensor 22 sets, as the direction of a line reading-out order, a direction based on an order direction setting signal from the reading-out setting section 35 which will be described later, performs line thinning-out by a thinning-out amount indicated by a thinning-out setting signal from a regional thinning-out setting section 34 which will be described later, and generates an image signal.

The signal processing section 30-3 performs subject recognition on the basis of the image signal generated by the image capturing section 20. The signal processing section 30-3 includes the motion detecting section 31, a regional distortion-amount estimating section 33, a regional thinning-out setting section 34, the reading-out setting section 35, the interpolation processing section 36, and a recognition processing section 37-3.

The motion detecting section 31 detects motion of the image capturing section 20. For example, in a case where the image capturing system 10 is mounted on a moving body such as a vehicle, the motion detecting section 31 detects the straight traveling speed and the angular velocity of the image capturing section 20 on the basis of a vehicle speed and a handle steering angle. The motion detecting section 31 outputs the motion detection result to the regional distortion-amount estimating section 33.

The regional distortion-amount estimating section 33 estimates an RS distortion amount for each region on the basis of the motion detected by the motion detecting section 31. The regional distortion-amount estimating section 33 estimates a RS distortion amount for each region after defining regions by a predetermined number of lines, for example. For the RS distortion amount in each region, a statistical amount, such as the average value, the median value, or the maximum values, of distortion amounts estimated for respective lines in the region is used. In addition, the regional distortion-amount estimating section 33 may perform division into regions on the basis of distortion amounts estimated for respective lines. For example, maximum values of distortion amounts estimated for respective lines are used. In a case where the difference between the maximum value of a certain line and the maximum value of an adjacent line is greater than a threshold, a region boundary may be set between these lines. The regional distortion-amount estimating section 33 outputs the estimation result of the distortion amount for each region to the regional thinning-out setting section 34.

The regional thinning-out setting section 34 sets a thinning-out amount for each region, according to the distortion amount in each region. The regional thinning-out setting section 34 calculates a regional thinning-out amount DAt according to the formula (2), by using a speed VS in a straight traveling direction, a speed VR in a rotation direction, and a map indicating a rolling shutter distortion tendency when a straight traveling is conducted. It is to be noted that "ka" and "kb" are preset coefficients. "KSmap" is a coefficient for the region based on the map indicating a rolling shutter distortion tendency when a straight traveling is conducted. The regional thinning-out setting section 34 outputs a regional thinning-out setting signal indicating the regional thinning-out amount set for each region, to the image capturing section 20 and the recognition processing section 37-3.

$$DAt=(ka \times VS \times KSmap)+(kb \times VRp) \quad (2)$$

The reading-out setting section 35 sets the direction of a reading-out order in the image capturing section 20 according to the motion detected by the motion detecting section 31. In a case where the image capturing section 20 is determined to be moving forward, the reading-out setting section 35 sets the direction of the line reading-out order to be upward from the lower side. In addition, in a case where the image capturing section 20 is determined to be moving rearward, the reading-out setting section 35 sets the direction of the line reading-out order to be downward from the upper side. The reading-out setting section 35 generates an order direction setting signal indicating the set direction of the reading-out order and outputs the order direction setting signal to the image capturing section 20 and the recognition processing section 37-3.

The interpolation processing section 36 performs an interpolation process by using the image signal outputted from the image capturing section 20 and generates an image signal of an interpolated image having lines the number of which is equal to that in the image before the thinning out, for example. The interpolation processing section 36 outputs the image signal after the interpolation process to the recognition processing section 37-3. It is to be noted that, in a case where thinning-out information indicating the state of thinning out is supplied from the image capturing section 20, the interpolation processing section 36 may perform the interpolation process on the basis of the thinning-out information or may perform the interpolation process on the basis of the thinning-out setting signal generated by the regional thinning-out setting section 34.

The recognition processing section 37-3 includes a recognizer switching section 371-3 and a plurality of recognizers 372-$d1$ to 372-$dn$ and 372-$u1$ to 372-$un$. It is to be noted that the recognizers 372-$d1$ to 372-$dn$ are provided to correspond to thinning-out amounts when the direction of the reading-out order is set to be downward from the upper side, while the recognizers 372-$u1$ to 372-$un$ are provided to correspond to thinning-out amounts when the direction of the reading-out order is set to be upward from the lower side. For example, the recognizer 372-$d1$ preliminarily stores a dictionary that is based on a learning image obtained by an interpolation process of an image captured by a regional thinning-out amount DAt-d1 when the direction of the reading-out order is set to be downward from the upper side, and performs a recognition process by using the dictionary. In addition, the recognizer 372-$un$ preliminarily stores a dictionary that is based on a learning image obtained by an interpolation process of an image captured by a regional thinning-out amount DAt-un when the direction of the reading-out order is set to be upward from the lower side, and performs a recognition process by using the dictionary.

The recognizer switching section 371-3 detects a processed region on the basis of the image signal generated by the image capturing section 20. Further, the recognizer switching section 371-3 determines a thinning-out amount in the processed region on the basis of the thinning-out amount set for each region by the regional thinning-out setting section, and switches a recognizer to be used for a subject recognition process according to the determined thinning-out amount in the processed region and the direction of the reading-out order by the reading-out setting section 35. The recognizer switching section 371-3 supplies the image signal to the recognizer 372-$x$ selected as a result of the switching, recognizes a subject in the processed region, and outputs the recognition result from the signal processing section 30-3.

3-2. Operation According to Third Embodiment

Figure 10:
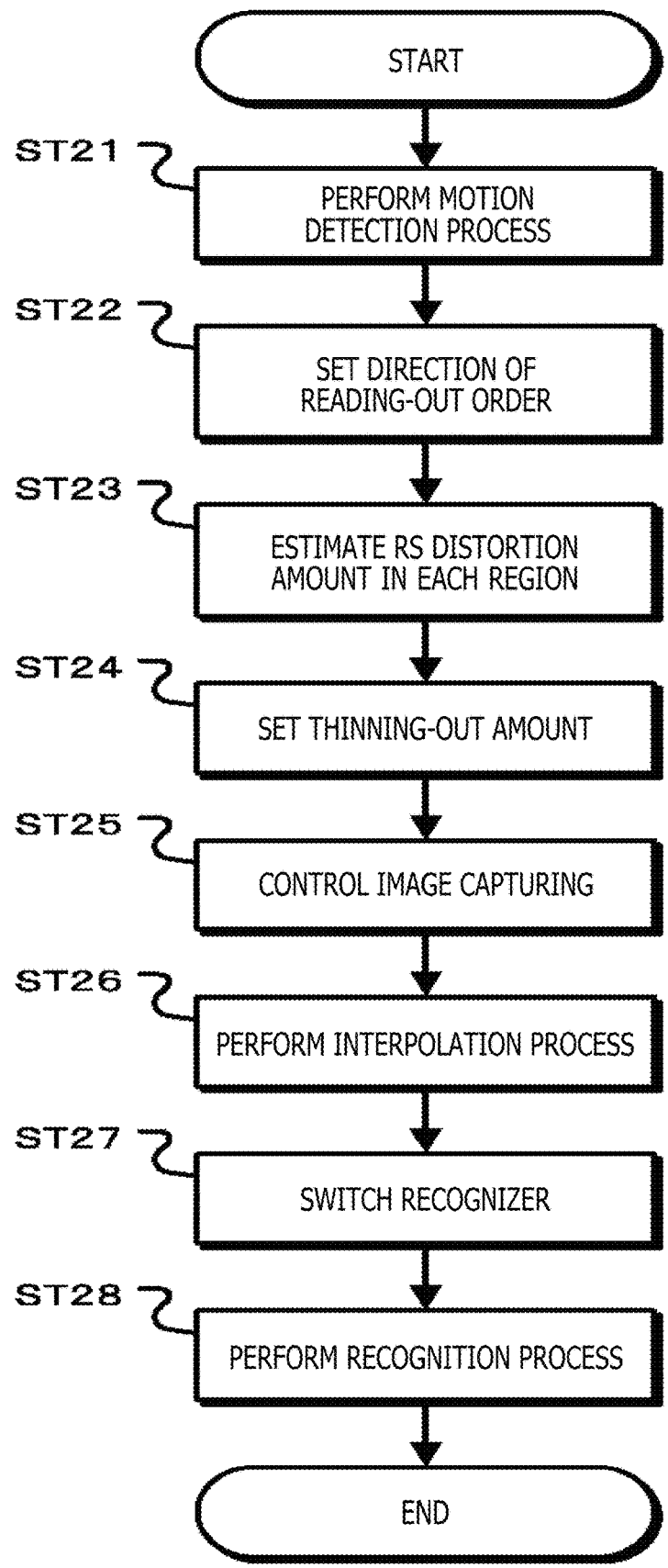
FIG. 10 is a flowchart of an operation according to the third embodiment.

FIG. 10 depicts a flowchart of an operation according to the third embodiment. In step ST21, the signal processing section 30-3 performs a motion detection process. The signal processing section 30-3 detects motion in a straight travel direction or in a rotation direction. For example, in a case where the image capturing system 10 is mounted on an automobile, the signal processing section 30-3 obtains, as a motion detection result, the speed of the automobile or the steering angle of a steering wheel. Then, the step proceeds to step ST22.

In step ST22, the signal processing section 30-3 sets the direction of a reading-out order. The signal processing section 30-3 sets the direction of the line reading-out order to be downward from the upper side or to be upward from the lower side on the basis of the motion detected in step ST21. Then, the step proceeds to step ST23.

In step ST23, the signal processing section 30-3 estimates a RS distortion amount in each region. The signal processing section 30-3 estimates the RS distortion amount in each region on the basis of the motion detected in step ST11. Then, the step proceeds to step ST24.

In step ST24, the signal processing section 30-3 sets a thinning-out amount. The signal processing section 30-3 sets a thinning-out amount on the basis of the RS distortion amount in each region estimated in step ST23. Then, the step proceeds to step ST125.

In step ST25, the signal processing section 30-3 controls image capturing. The signal processing section 30-3 generates a thinning-out setting signal indicating the thinning-out amount set in step ST24 and an order direction setting signal indicating the direction of the reading-out order set in step ST22. The signal processing section 30-3 outputs the generated thinning-out setting signal and the generated order direction setting signal to the image capturing section 20. Accordingly, the image capturing section 20 generates an image signal of a thinned-out image in which line thinning-out has been performed in the direction of the reading-out order set in step ST22 by the thinning-out amount set in step ST24. Then, the step proceeds to step ST26.

In step ST26, the signal processing section 30-3 performs an interpolation process. The signal processing section 30-3 performs the interpolation process by using the image signal of the thinned-out image generated by the image capturing section 20 and generates an image signal of the interpolated image having lines the number of which is equal to that before the line thinning-out. Then, the step proceeds to step ST27.

In step ST27, the signal processing section 30-3 switches a recognizer. The signal processing section 30-3 performs switching to, as a recognizer for performing subject recognition by using the image signal of the interpolated image, a recognizer that corresponds to the direction of the reading-out order set in step ST22 and the thinning-out amount set in step ST24. Then, the step proceeds to step ST28.

In step ST28, the signal processing section 30-3 performs a recognition process. By using the image signal of the interpolated image generated in step ST26, the signal processing section 30-3 performs a subject recognition process with the recognizer selected as a result of the switching in step ST27.

As explained so far, according to the third embodiment, the direction of a reading-out order and a thinning-out amount in each region are set according to the relative position change between the image capturing section and a subject, and a captured image which has little rolling shutter distortion and in which the subject is prevented from missing can be obtained. Further, since a recognizer that corresponds to the thinning-out amount and the order of the reading-out order in the captured image thus obtained is used, the subject can be recognized with precision on the basis of the captured image having little rolling shutter distortion.

4. Fourth Embodiment

Meanwhile, the case where subject recognition is performed on the basis of an image obtained by the image capturing section has been explained in each of the above embodiments. However, in a corresponding-point search which is conducted in generation of a depth map, SLAM (Simultaneous Localization and Mapping), or the like, a process in which rolling shutter distortion is taken into consideration may be performed.

4-1. Configuration According to Fourth Embodiment

FIG. 11 illustrates a configuration according to a fourth embodiment. The image capturing system 10 includes the image capturing lens 21, the image capturing section 20, and a signal processing section 30-4.

The image capturing section 20 includes the image capturing lens 21 and the image sensor 22. The image capturing lens 21 of the image capturing section 20 is formed by using a focus lens, a zoom lens, or the like and forms an optical image of a subject on an image capturing surface of the image sensor 22.

The image sensor 22 is formed by using a CMOS (Complementary Metal Oxide Semiconductor) image sensor, for example. The image sensor 22 performs a rolling shutter operation to generate an image signal according to the optical image of the subject and outputs the image signal to the signal processing section 30-4. Further, the image sensor 22 sets, as the direction of a line reading-out order, a direction based on a reading-out order direction setting signal from the reading-out setting section 35 which will be described later, performs line thinning-out by a thinning-out amount indicated by a thinning-out setting signal from the thinning-out setting section 32 which will be described later, and generates an image signal.

The signal processing section 30-4 performs image processing on the basis of the image signal generated by the image capturing section 20. The signal processing section 30-4 includes the motion detecting section 31, the thinning-out setting section 32, the interpolation processing section 36, and an image processing section 38.

The motion detecting section 31 detects motion of the image capturing section 20. For example, in a case where the image capturing system 10 is mounted on a moving body such as a vehicle, the motion detecting section 31 detects the straight traveling speed and the angular velocity of the image capturing section 20 on the basis of the vehicle speed and the steering angle of a steering wheel. The motion detecting section 31 outputs the motion detection result to the thinning-out setting section 32.

The thinning-out setting section 32 sets a thinning-out amount according to the motion detected by the motion detecting section 31. The thinning-out setting section 32 outputs a thinning-out setting signal indicating the set thinning-out amount to the image processing section 38.

The interpolation processing section 36 performs an interpolation process by using the image signal outputted from the image capturing section 20 and generates an image signal of an interpolated image having lines the number of which is equal to that in the image before the thinning out, for example. The interpolation processing section 36 outputs the image signal after the interpolation process to the recognition processing section 37-4. It is to be noted that, in a case where thinning-out information indicating the state of thinning out is supplied from the image capturing section 20, the interpolation processing section 36 may perform the interpolation process on the basis of the thinning-out information or may perform the interpolation process on the basis of the thinning-out setting signal generated by the thinning-out setting section 32.

The image processing section 38 conducts the corresponding-point search by using the image signal after the interpolation process, and generates a depth map or performs SLAM by stereo matching. In the corresponding-point search, the image processing section 38 sets a search range and reliability on the basis of the thinning-out setting signal generated by the thinning-out setting section 32. For example, in setting of the search range, the search range is set to be wider as the rolling shutter distortion is larger. In addition, the search range may be set to be wider in the line direction because rolling shutter distortion occurs in the line direction. Further, when rolling shutter distortion occurs, the matching accuracy is deteriorated. Therefore, the reliability of a corresponding point is used to perform SLAM or generate a depth map.

4-2. Operation According to Fourth Embodiment

In the fourth embodiment, step ST1 to step ST4 in the flowchart depicted in FIG. 2 are performed, and then, image processing is performed. In the image processing, the corresponding-point search is conducted, and the search range and the reliability in the corresponding-point search are adjusted according to a RS distortion amount.

In setting of the search range, the search range is set to enable detection of a corresponding point in a case where a subject is expanded due to rolling shutter distortion, for example, and the search range is narrowed to enable efficient detection of a corresponding point in a case where a subject is compressed. In addition, the reliability is reduced with increase of a RS distortion amount because the matching accuracy is deteriorated with increase of a RS distortion amount.

FIG. 12 is a diagram for explaining reliability in a case where a depth map is acquired. In FIG. 12, (a) is a left viewpoint image, and (b) depicts a rolling shutter distortion map corresponding to the left viewpoint image. It is to be noted that, in the rolling shutter distortion map, a region with no hatch line, a hatched region with thick hatch lines, and a hatched region with thin hatch lines represent a region in which the RS distortion amount is small, a region in which the RS distortion amount is large, and a region in which the RS distortion amount is neither small nor large, respectively. In addition, in FIG. 12, (c) is a right viewpoint image, and (d) depicts a rolling shutter distortion map corresponding to the right viewpoint image. Here, in a case where lens distortion occurs in an image obtained by a left-viewpoint image capturing section, a lens distortion correcting process of the left viewpoint image and the rolling shutter distortion map is performed, in step ST31, by use of a correction coefficient corresponding to a lens used by the left-viewpoint image capturing section. Also, in a case where lens distortion occurs in an image obtained by a right-viewpoint image capturing section, a lens distortion correcting process of the right viewpoint image and the rolling shutter distortion map is performed, in step ST32, by use of a correction coefficient corresponding to a lens used by the right-viewpoint image capturing section. It is to be noted that, in FIG. 12, (e) is a left viewpoint image having undergone the lens distortion correcting process, and (f) depicts a rolling shutter distortion map corresponding to the left viewpoint image having undergone the lens distortion correcting process. Also, in FIG. 12, (g) is a right viewpoint image having undergone the lens distortion correcting process, and (h) depicts a rolling shutter distortion map corresponding to the right viewpoint image having undergone the lens distortion correcting process.

In a stereo matching process in step ST33, a matching process using the left viewpoint image having undergone the lens distortion correcting process depicted in (e) in FIG. 12 and the right viewpoint image having undergone the lens distortion correcting process depicted in (g) in FIG. 12 is performed such that a depth map indicating depths of respective pixel positions in the left viewpoint image as depicted in (i) in FIG. 12, for example, is generated. It is to be noted that the depth map indicates that a distance is longer as the brightness is lower. In a reliability process in step ST34, the rolling shutter distortion map (f) in FIG. 12 is used for reliability in the depth map. In (j) in FIG. 12, reliability is depicted. In (j), a region with no horizontal line, a hatched region with thick horizontal lines, and a hatched region with thin vertical lines represent a region in which the reliability is high, a region in which the reliability is low, and a region in which the reliability is neither high nor low, respectively. Next, in the following process based on the reliability, the depth in a region in which the reliability is low is made ineffective, for example. Alternatively, the depth in a region in which the reliability is low may be subjected to a temporal or spatial interpolation process by using the depth in a region in which the reliability is not low.

FIG. 13 is a diagram for explaining reliability in SLAM. In FIG. 13, (a) is an image captured at time T and having undergone the lens distortion correcting process, and (b) depicts a rolling shutter distortion map corresponding to the captured image. Also, in FIG. 13, (c) is an image captured at time T−1 and having undergone the lens distortion correcting process, and (d) depicts a rolling shutter distortion map corresponding to the captured image. It is to be noted that it is sufficient to perform processes similar to those for acquiring a depth map, in the captured images having undergone the lens distortion correcting process and the rolling shutter distortion maps.

In SALM, a feature point pair is extracted in step ST41 by use of images captured at time T and time T−1 and having undergone the lens distortion correcting process. It is to be noted that (e) and (f) in FIG. 13 illustrate a case where three feature points are included in a feature point pair FP. Each apex of a triangle representing the feature point pair is the feature point. Reliabilities at times T and T−1 are calculated for each feature pair in steps ST42 and 43, respectively. In addition, in SALM, a movement amount of each feature point pair is extracted in step ST44 on the basis of the feature point pair at time T and the feature point pair at time T−1. Here, reliability at time T is calculated for each feature point pair. For example, reliability RP (T) of a feature point pair FP at time T is calculated by use of distortion degrees $Dp_i$ at N feature points $p_i$ (i=1 to N) included in the feature point pair FP, according to the formula (3). It is to be noted that a distortion degree Dpi is a rolling shutter distortion degree of feature points pi in a rolling shutter distortion map at time T. It is assumed that a distortion degree in a rolling shutter distortion map is set such that the distortion degree ="1" in a case where no distortion has occurred, and the distortion degree approaches "0" as the distortion becomes larger.

[Math. 1]

$$RP(T)=\Sigma_{i \in N}[DP_i] \quad (3)$$

Reliability at time T−1 is calculated by use of the rolling shutter distortion map at time T−1 in a similar manner to the reliability at time T.

In SALM, next, a reliability process is performed in step ST45 such that a movement amount LV (T, T−1) in SLAM is calculated according to the formula (4), on the basis of movement amounts $L_j$, reliabilities $RP(T)_j$ at time T, and reliabilities $RP(T-1)_j$ at time T−1 regarding M feature point pairs $FP_j$ (j=1 to M).

[Math. 2]

$$LV_{(T,T-1)}=\Sigma_{j \in M}[L_j \times RP(T)_j \times RP(T-1)_j] \quad (4)$$

As explained so far, according to the fourth embodiment, generation of a depth map or processing of SLAM is performed by using rolling shutter distortion. Accordingly, generation of a depth map or processing of SLAM can be performed with high precision, compared to a case in which rolling shutter distortion is not used.

5. Modifications

In order to detect motion, a vehicle speed and a steering angle are used in each of the abovementioned embodiments. However, motion of the image capturing section may be detected by using an IMU (Inertial Measurement Unit) to detect an acceleration or an angular velocity.

In addition, a thinning-out amount is set on the basis of the motion detection result, but a thinning-out amount may be set according to an image capturing scene. For example, when image information or map information and self-position information (including the orientation in the self-position) are used, what scene is captured by an image capturing section can be presumed.

FIG. 14 illustrates the relation between a scene presumption result and a thinning-out amount. In FIG. 14, (a) depicts a case where a scene is determined to have an open front side on the basis of image information, map information, or the like. In this case, a thinning-out amount for a subject (e.g., a road surface) on the front side is set to be large, as depicted in (b) in FIG. 14 because a change in the relative position relation between the image capturing section and the subject is large and the RS distortion amount is large. Further, a thinning-out amount for a subject (e.g., the sky) on the depth side is set to be small because a change in the relative position relation between the image capturing section and the subject is small and the RS distortion amount is small. Further, a thinning-out amount for a subject (e.g., a mountain) in the middle position is set to be medium because a change in the relative position relation between the image capturing section and the subject is neither large nor small.

In FIG. 14, (c) depicts a case where a scene is determined as a city area including many buildings on the basis of image information, map information, or the like. In this case, a thinning-out amount for a subject (e.g., a road surface) on the front side is set to be large, as depicted in (d) in FIG. 14 because a change in the relative position relation between the image capturing section and the subject is large and the RS distortion amount is large. Further, a thinning-out amount for a subject (e.g., a building that is located ahead) in the center or upper part is set to be medium because a change in the relative position relation between the image capturing section and the subject is neither large nor small.

In FIG. 14, (e) depicts a case where a scene is determined as an uphill slope on the basis of image information, map information, or the like. In this case, a thinning-out amount for a subject (e.g., a road surface) on the front side is set to be large, as depicted in (f) in FIG. 14 because a change in the relative position relation between the image capturing section and the subject is large and the RS distortion amount is large. Further, a thinning-out amount for a subject (e.g., a road in the distance) in the upper part is set to be small because a change in the relative position relation between the image capturing section and the subject is small. Further, a thinning-out amount for a subject (e.g., an uphill part located ahead) in the center part is set to be medium because a change in the relative position relation between the image capturing section and the subject is neither large nor small.

Also, in some cases, a moving object is included in an image capturing range, and rolling shutter distortion becomes large due to motion of the moving object. Therefore, the moving object may be detected on the basis of a plurality of captured images in a time direction obtained by the image capturing section, and a thinning-out amount may be set to be large in a region where motion of the moving object is large.

FIG. 15 illustrates a case where a moving object is included in a captured image. It is to be noted that an automobile is the moving object in FIG. 15. In FIG. 15, (a) illustrates a captured image of a city area scene including a moving object (e.g., automobile) OBm.

For example, the moving body is moving in a horizontal direction. A detection result obtained by motion detection on a block-by-block basis is illustrated in (b) in FIG. 15 in which a cross-hatched region BKm including the moving object is detected as a region in which the motion is large. In addition, as depicted in (c) in FIG. 15, the signal processing section 30-4 sets a thinning-out amount to be large in a line region including the large motion region BKm. As a result of such a process, not only in a case where a subject is still but also in a case where a subject is a moving object, a thinning-out amount can be adjusted according to motion of the subject, so that a recognition process can be performed with precision.

6. Application Example

The technology according to the present disclosure is applicable to various products. For example, the technology according to the present disclosure may be realized as a device that is mounted on any one of moving bodies including an automobile, an electric automobile, a hybrid electric automobile, a motorcycle, a bicycle, a personal mobility, an aircraft, a drone, a ship, a robot, a construction machine, an agricultural machine (tractor), and the like.

Figure 16:
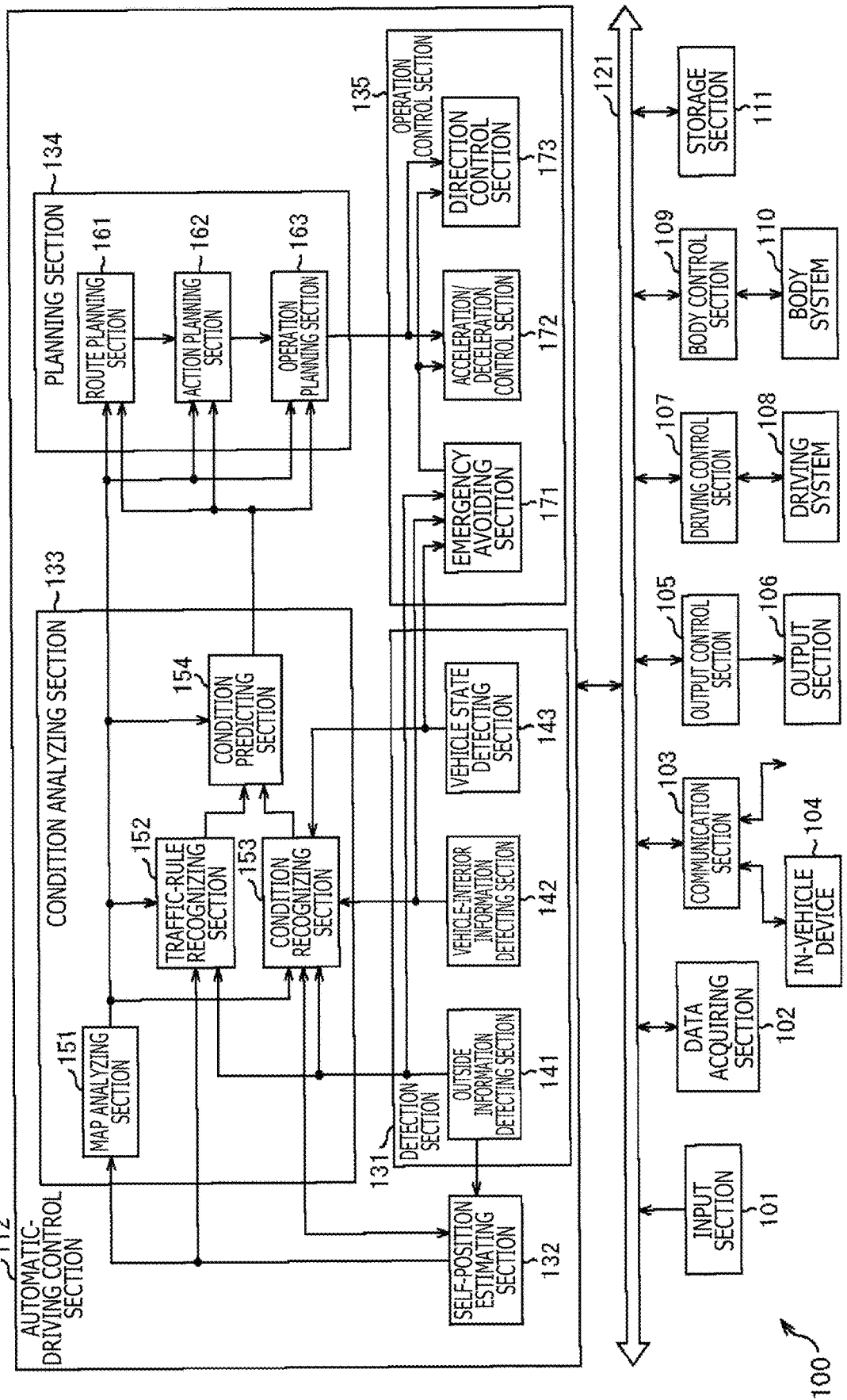
FIG. 16 is a block diagram schematically depicting a functional configuration example of a vehicle control system.

FIG. 16 is a block diagram schematically depicting a functional configuration example of a vehicle control system 100 that is one example of a moving body control system to which the present technique is applicable.

Hereinafter, in a case where a vehicle on which the vehicle control system 100 is mounted is distinguished from another vehicle, the vehicle on which the vehicle control system 100 is mounted is referred to as a subject vehicle.

The vehicle control system 100 includes an input section 101, a data acquiring section 102, a communication section 103, an in-vehicle device 104, an output control section 105, an output section 106, a driving control section 107, a driving system 108, a body control section 109, a body system 110, a storage section 111, and an automatic-driving control section 112. The input section 101, the data acquiring section 102, the communication section 103, the output control section 105, the driving control section 107, the body control section 109, the storage section 111, and the automatic-driving control section 112 are mutually connected over a communication network 121. For example, the communication network 121 includes a bus or an in-vehicle communication network, such as a CAN (Controller Area Network), a LIN (Local Interconnect Network), a LAN (Local Area Network), or FlexRay (registered trademark), conforming to any standard. It is to be noted that the respective sections in the vehicle control system 100 may be directly connected not over the communication network 121.

It is to be noted that, hereinafter, in a case where the respective sections in the vehicle control system 100 perform communication over the communication network 121, the description of the communication network 121 is omitted. For example, in a case where the input section 101 communicates with the automatic-driving control section 112 over the communication network 121, a simple expression that the input section 101 communicates with the automatic-driving control section 112 is used.

The input section 101 includes a device which an occupant uses for inputting various kinds of data or indications, etc. For example, the input section 101 includes an operation device such as a touch panel, a button, a microphone, a switch, or a lever, or an operation device to which an input can be made by a method using voice, gestures, or the like without a manual operation. Alternatively, for example, the input section 101 may be a remote control device using infrared rays or any other radio waves, or may be an external connection device such as a mobile or wearable device that handles an operation in the vehicle control system 100. The input section 101 generates an input signal on the basis of data or indications, etc., inputted by an occupant, and supplies the signal to the respective sections in the vehicle control system 100.

The data acquiring section 102 includes various types of sensors that acquire data for use in processes in the vehicle control system 100, and supplies the acquired data to the respective sections in the vehicle control system 100.

For example, the data acquiring section 102 includes various types of sensors for detecting the states of the subject vehicle or the like. Specifically, the data acquiring section 102 includes a gyroscope, an acceleration sensor, an inertial measurement unit (IMU), and a sensor for detecting an operation amount of an accelerator pedal, an operation amount of a brake pedal, the steering angle of a steering wheel, the rotational speed of an engine, the rotational speed of a motor, or the rotational speed of a wheel, for example.

Further, the data acquiring section 102 includes various types of sensors for detecting information regarding the outside of the subject vehicle, for example. Specifically, the data acquiring section 102 includes an image capturing device such as a ToF (Time Of Flight) camera, a stereo camera, a single-lens camera, an infrared camera, or any other camera, for example. Also, the data acquiring section 102 includes an environment sensor for detecting the weather, the atmospheric phenomena, or the like, and a peripheral information sensor for detecting an object around the subject vehicle, for example. For example, the environment sensor includes a raindrop sensor, a fog sensor, a sunshine sensor, a snow sensor, or the like. For example, the peripheral information sensor includes an ultrasonic wave sensor, a radar, a LiDAR (Light Detection and Ranging, Laser Imaging Detection and Ranging), a sonar, or the like.

In addition, the data acquiring section 102 includes various types of sensors for detecting the current position of the subject vehicle, for example. Specifically, for example, the data acquiring section 102 includes a GNSS receiver for receiving a GNSS signal from a GNSS (Global Navigation Satellite System) satellite or the like.

In addition, the data acquiring section 102 incudes various types of sensors for detecting information regarding the vehicle interior, for example. Specifically, the data acquiring section 102 includes an image capturing device that captures an image of a driver, a biological sensor that detects driver's biological information, a microphone that collects sounds in the vehicle interior, and the like, for example. The biological sensor is provided in a seat surface or a steering wheel, for example, and detects biological information regarding an occupant who is seated on the seat or a driver who is holding the steering wheel.

The communication section 103 communicates with the in-vehicle device 104, various vehicle outside devices, a server, a base station, and the like, transmits data supplied from the respective sections in the vehicle control system 100, and supplies received data to the respective sections in the vehicle control system 100. It is to be noted that a communication protocol which is supported by the communication section 103 is not limited to a particular one. Further, the communication section 103 can support a plurality of types of communication protocols.

For example, the communication section 103 performs wireless communication with the in-vehicle device 104 via a wireless LAN, Bluetooth (registered trademark), NFC (Near Field Communication), a WUSB (Wireless USB), or the like. In addition, for example, the communication section 103 performs wired communication with the in-vehicle device 104 by using an USB (Universal Serial Bus), an HDMI (registered trademark) (High-Definition Multimedia Interface), an MHL (Mobile High-definition Link), or the like, through a connection terminal which is not illustrated (and a cable, if needed).

Further, for example, the communication section 103 performs communication with a device (e.g., an application server or a control server) in an external network (e.g., the Internet, a cloud network, or a company-specific network) via a base station or an access point. In addition, for example, the communication section 103 performs communication with a terminal (e.g., a pedestrian or shop terminal, or an MTC (Machine Type Communication) terminal) that exists around the subject vehicle, by using a P2P (Peer To Peer) technology. Further, for example, the communication section 103 performs V2X communication such as vehicle-to-vehicle communication, vehicle-to-infrastructure communication, vehicle-to-home communication, vehicle-to-pedestrian communication, or the like. Moreover, for example, the communication section 103 includes a beacon receiving section to receive radio waves or electromagnetic waves emitted from a wireless station or the like installed on a road, and to acquire information regarding the current position, traffic congestion, traffic regulations, a required time, or the like.

The in-vehicle device 104 includes a mobile or wearable device owned by an occupant, an information device introduced or attached to the subject vehicle, a navigation device that searches for a route to any destination, and the like, for example.

The output control section 105 controls outputs of various types of information to an occupant in the subject vehicle or to the outside of the vehicle. For example, the output control section 105 generates an output signal including at least one of visual information (e.g., image data) or auditory information (e.g., sound data) and supplies the output signal to the output section 106, thereby controlling outputs of visual information and auditory information from the output section 106. Specifically, for example, the output control section 105 generates a bird's-eye view image, a panorama image, or the like by combining image data sets obtained by different image capturing devices in the data acquiring section 102, and supplies an output signal including the generated image to the output section 106. In addition, for example, the output control section 105 generates sound data including an alarm sound, an alarm message, or the like regarding a collision, a contact, an intrusion to a dangerous area, or the like, and supplies an output signal including the generated sound data to the output section 106.

The output section 106 includes a device that is capable of outputting the visual information or the auditory information to an occupant in the subject vehicle or the outside of the vehicle. For example, the output section 106 includes a display device, an instrument panel, an audio speaker, a headphone, a wearable device such as a glasses-type display to be worn by an occupant, a projector, a lamp, and the like. Examples of the display device included in the output section 106 include not only a normal display-equipped device but also a device that displays the visual information within the visual field of a driver, such as a head-up display, a transmission type display, or a device having an AR (Augmented Reality) display function.

The driving control section 107 controls the driving system 108 by generating various control signals and supplying the signals to the driving system 108. Further, the driving control section 107 gives a notification or the like regarding the controlled state of the driving system 108 to the respective sections other than the driving system 108 by supplying the control signals to the sections, if needed.

The driving system 108 includes various types of devices related to the driving system of the subject vehicle. For example, the driving system 108 includes a driving force generating device for generating a driving force for an internal combustion engine, a driving motor, or the like, a driving force transmission mechanism for transmitting a driving force to wheels, a steering mechanism for adjusting a steering angle, a brake device for generating a braking force, an ABS (Antilock Brake System), an ESC (Electronic Stability Control), an electric power steering device, and the like.

The body control section 109 controls the body system 110 by generating various control signals and supplying the signals to the body system 110. Further, the body control section 109 gives a notification or the like regarding the controlled state of the body system 110 to the respective sections other than the body system 110 by supplying the control signals to the sections, if needed.

The body system 110 includes various types of body system devices installed on a vehicle body. For example, the body system 110 includes a keyless entry system, a smart key system, a power window device, a power seat, a steering wheel, an air conditioning device, various lamps (e.g., headlamps, back lamps, brake lamps, turn signals, fog lamps, etc.), and the like.

The storage section 111 includes a magnetic storage device, a semiconductor storage device, an optical storage device, and a magneto-optical device such as a ROM (Read Only Memory), a RAM (Random Access Memory), or an HDD (Hard Disc Drive), etc. The storage section 111 stores various kinds of programs and data, etc., which are used by the respective sections in the vehicle control system 100. For example, the storage section 111 stores map data such as a high-precision three-dimensional map (e.g., dynamic map), a global map that has a lower accuracy but covers a wider area than a high-precision map, and a local map including information regarding the surrounding area of the subject vehicle.

The automatic-driving control section 112 performs control concerning autonomous traveling or automatic driving such as driving assistance. Specifically, for example, the automatic-driving control section 112 performs cooperative control for implementing ADAS (Advanced Driver Assistance System) functions including collision avoidance or shock relaxation of the subject vehicle, following traveling based on a vehicle distance, traveling at maintained vehicle speed, a collision warning of the subject vehicle, a lane deviation warning of the subject vehicle, or the like. Further, for example, the automatic-driving control section 112 performs cooperative control for automatic driving or the like to achieve autonomous traveling without depending on a driver's operation. The automatic-driving control section 112 includes a detection section 131, a self-position estimating section 132, a condition analyzing section 133, a planning section 134, and an operation control section 135.

The detection section 131 detects various kinds of information necessary to control automatic driving. The detection section 131 includes an outside information detecting section 141, a vehicle-interior information detecting section 142, and a vehicle state detecting section 143.

The outside information detecting section 141 performs a detection process of information regarding the outside of the subject vehicle, on the basis of data or signals from the respective sections in the vehicle control system 100. For example, the outside information detecting section 141 detects, identifies, and tracks an object around the subject vehicle, and detects the distance to the object. Examples of an object to be detected include a vehicle, a person, an obstacle, a structure, a road, a traffic signal, a traffic sign, and a road sign. In addition, for example, the outside information detecting section 141 performs a detection process of a surrounding environment of the subject vehicle. Examples of a surrounding environment to be detected include weather, temperature, humidity, brightness, and road conditions. The outside information detecting section 141 supplies data indicating the result of the detection process to the self-position estimating section 132, a map analyzing section 151, a traffic-rule recognizing section 152, and a condition recognizing section 153 of the condition analyzing section 133, an emergency avoiding section 171 of the operation control section 135, and the like.

The vehicle-interior information detecting section 142 performs a detection process of information regarding the vehicle interior, on the basis of data or signals from the respective sections in the vehicle control system 100. For example, the vehicle-interior information detecting section 142 authenticates and identifies a driver, detects driver's conditions, detects an occupant, and detects a vehicle interior environment. Examples of driver's conditions to be detected include physical conditions, a wakefulness level, a concentration level, a fatigue level, and a visual line direction. Examples of a vehicle interior environment to be detected include temperature, humidity, brightness, and smell. The vehicle-interior information detecting section 142 supplies data indicating the result of the detection process to the condition recognizing section 153 of the condition analyzing section 133, the emergency avoiding section 171 of the operation control section 135, and the like.

The vehicle state detecting section 143 performs a detection process of a state of the subject vehicle, on the basis of data or signals from the respective sections in the vehicle control system 100. Examples of a state of the subject vehicle to be detected include a speed, an acceleration, a steering angle, the presence or absence of an abnormality and the details thereof, a driving operation state, the position and inclination of a power seat, a door lock state, and the state of any other in-vehicle devices. The vehicle state detecting section 143 supplies data indicating the result of the detection process to the condition recognizing section 153 of the condition analyzing section 133, the emergency avoiding section 171 of the operation control section 135, and the like.

The self-position estimating section 132 performs an estimation process of the position, the attitude, etc., of the subject vehicle on the basis of data or signals from the respective sections such as the outside information detecting section 141 and the condition recognizing section 153 of the condition analyzing section 133 in the vehicle control system 100. Further, the self-position estimating section 132 generates a local map (hereinafter, referred to as a self-position estimation map) for estimating the self-position, if needed. For example, a high-precision map using a SLAM (Simultaneous Localization and Mapping) technology or the like is used as the self-position estimation map. The self-position estimating section 132 supplies data indicating the result of the estimation process to the map analyzing section 151, the traffic-rule recognizing section 152, and the condition recognizing section 153 of the condition analyzing section 133, and the like. In addition, the self-position estimating section 132 causes the storage section 111 to store the self-position estimation map.

The condition analyzing section 133 performs an analysis process of the conditions of the subject vehicle and the surrounding conditions. The condition analyzing section 133 includes the map analyzing section 151, the traffic-rule recognizing section 152, the condition recognizing section 153, and a condition predicting section 154.

The map analyzing section 151 constructs a map including information necessary for automatic driving processes by analyzing various maps stored in the storage section 111 while using, if needed, data or signals from the respective sections such as the self-position estimating section 132 and the outside information detecting section 141 in the vehicle control system 100. The map analyzing section 151 supplies the constructed map to the traffic-rule recognizing section 152, the condition recognizing section 153, the condition predicting section 154, and to a route planning section 161, an action planning section 162, and an operation planning section 163 of the planning section 134, etc.

The traffic-rule recognizing section 152 performs a recognition process of a traffic rule in the surrounding area of the subject vehicle on the basis of data or signals from the respective sections such as the self-position estimating section 132, the outside information detecting section 141, and the map analyzing section 151 in the vehicle control system 100. As a result of the recognition process, the position and state of a traffic signal in the surrounding area of the subject vehicle, the details of a traffic regulation in the surrounding area of the subject vehicle, and a lane in which the vehicle can travel, and the like are recognized. The traffic-rule recognizing section 152 supplies data indicating the result of the recognition process to the condition predicting section 154, etc.

The condition recognizing section 153 performs a recognition process of conditions concerning a state of the subject vehicle, on the basis of data or signals from the respective sections such as the self-position estimating section 132, the outside information detecting section 141, the vehicle-interior information detecting section 142, the vehicle state detecting section 143, and the map analyzing section 151 in the vehicle control system 100. For example, the condition recognizing section 153 recognizes conditions of the subject vehicle, surrounding conditions of the subject vehicle, conditions of a driver of the subject vehicle, and the like. Further, the condition recognizing section 153 generates a local map (hereinafter, referred to as a condition recognition map) for recognizing surrounding conditions of the subject vehicle, if needed. For example, an occupancy grid map is used as the condition recognition map.

Examples of conditions of the subject vehicle to be recognized include the position, attitude, and motion (e.g., speed, acceleration, moving direction, or the like) of the subject vehicle, and the presence or absence of an abnormality and the details thereof. Examples of surrounding conditions of the subject vehicle to be recognized include the type and position of a still object in the surrounding area, the type, position, and motion (e.g., speed, acceleration, moving direction, or the like) of a moving object in the surrounding area, the structure of a surrounding road and the road surface conditions thereof, and weather, temperature, humidity, and brightness in the surrounding area. Examples of conditions of a driver of the subject vehicle to be recognized include physical conditions, a wakefulness level, a concentration level, a fatigue level, movement of a visual line, and a driving operation.

The condition recognizing section 153 supplies data indicating the result of the recognition process (including the condition recognition map, if needed) to the self-position estimating section 132, the condition predicting section 154, and the like. Further, the condition recognizing section 153 causes the storage section 111 to store the condition recognition map.

The condition predicting section 154 performs a prediction process of conditions concerning the subject vehicle, on the basis of data or signals from the respective sections such as the map analyzing section 151, the traffic-rule recognizing section 152, and the condition recognizing section 153 in the vehicle control system 100. For example, the condition predicting section 154 predicts conditions of the subject vehicle, surrounding conditions of the subject vehicle, conditions of a driver, and the like.

Examples of conditions of the subject vehicle to be predicted include a behavior of the subject vehicle, occurrence of an abnormality, and a travelable distance. Examples of surrounding conditions of the subject vehicle to be predicted include a behavior of a moving body, a state change of a traffic signal, and an environmental change such as a weather change in the surrounding area of the subject vehicle. Examples of conditions of a driver to be predicted include a driver's behavior and driver's physical conditions.

The condition predicting section 154 supplies data indicating the result of the prediction process as well as the data from the traffic-rule recognizing section 152 and the condition recognizing section 153, to the route planning section 161, the action planning section 162, the operation planning section 163, etc., of the planning section 134.

The route planning section 161 plans a route to a destination on the basis of data or signals from the respective sections such as the map analyzing section 151 and the condition predicting section 154 in the vehicle control system 100. For example, the route planning section 161 sets a route from the current position to a designated destination on the basis of a global map. Also, for example, the route planning section 161 changes the route, as appropriate, on the basis of a traffic congestion, an accident, a traffic regulation, construction conditions, driver's physical conditions, and the like. The route planning section 161 supplies data indicating the planned route to the action planning section 162 and the like.

The action planning section 162 plans a subject vehicle action for safely traveling along the route planned by the route planning section 161 within a planned time period, on the basis of data or signals from the respective sections such as the map analyzing section 151 and the condition predicting section 154 in the vehicle control system 100. For example, the action planning section 162 plans a start, a stop, a travel direction (e.g., forward movement, rearward movement, left turn, right turn, direction change, or the like), a travel lane, a travel speed, passing, and the like. The action planning section 162 supplies data indicating the planned subject vehicle action to the operation planning section 163 and the like.

The operation planning section 163 plans a subject vehicle operation for implementing the action planned by the action planning section 162, on the basis of data or signals from the respective sections such as the map analyzing section 151 and the condition predicting section 154 in the vehicle control system 100. For example, the operation planning section 163 makes a plan regarding an acceleration, a deceleration, a travel track, or the like. The operation planning section 163 supplies data indicating the planned subject vehicle operation to an acceleration/deceleration control section 172 and a direction control section 173 of the operation control section 135, etc.

The operation control section 135 controls the operation of the subject vehicle. The operation control section 135 includes the emergency avoiding section 171, the acceleration/deceleration control section 172, and the direction control section 173.

The emergency avoiding section 171 performs a detection process of an emergency such as a collision, a contact, an intrusion into a dangerous area, a driver's abnormality, or an abnormality in a vehicle, on the basis of the detection results obtained by the outside information detecting section 141, the vehicle-interior information detecting section 142, and the vehicle state detecting section 143. In a case where detecting occurrence of such an emergency, the emergency avoiding section 171 plans a subject vehicle operation such as a sudden stop or a sudden turn to avoid the emergency. The emergency avoiding section 171 supplies data indicating the planned subject vehicle operation to the acceleration/deceleration control section 172, the direction control section 173, and the like.

The acceleration/deceleration control section 172 performs an acceleration/deceleration control for implementing the subject vehicle operation planned by the operation planning section 163 or the emergency avoiding section 171. For example, the acceleration/deceleration control section 172 calculates a control target value of the driving force generating device or the braking device for implementing the planned acceleration, deceleration, or sudden stop, and supplies a control command indicating the calculated control target value to the driving control section 107.

The direction control section 173 performs a direction control for implementing the subject vehicle operation planned by the operation planning section 163 or the emergency avoiding section 171. For example, the direction control section 173 calculates a control target value of the steering mechanism for implementing a travel track or a sudden turn planned by the operation planning section 163 or the emergency avoiding section 171, and supplies a control command indicating the calculated control target value to the driving control section 107.

In the vehicle control system 100 described above, the image capturing section 20 and the signal processing section 30-1 (30-2, 30-3, 30-4), which have been explained in the present embodiments, correspond to the data acquiring section 102 and the outside information detecting section 141, respectively. In a case where the image capturing section 20 and the signal processing section 30-1 (30-2, 30-3, 30-4) are provided in the vehicle control system 100, a thinning-out amount of the image capturing section 20 is set according to a change in the relative position relation between a vehicle equipped with the vehicle control system 100 and an object outside the vehicle, and image capturing is performed. Accordingly, a captured image having little rolling shutter distortion can be obtained. In addition, since switching to a recognizer corresponding to the thinning-out amount is performed and a subject is recognized, the subject can be recognized with high precision, compared to a case where subject recognition is performed without switching of a recognizer.

Further, the series of processes explained herein can be executed by hardware, software, or a combination thereof. In a case where the processes are executed by software, a program having a sequence of the processes recorded therein is executed after being installed into a memory of a computer incorporated in dedicated hardware. Alternatively, the program can be installed into a general-purpose computer that is capable of various processes, and be executed.

For example, the program can be preliminarily recorded in a hard disk, an SSD (Solid State Drive), or a ROM (Read Only Memory) as a recording medium. Alternatively, the program can be temporarily or permanently stored (recorded) in a removable recording medium such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, or a semiconductor memory card. Such a removable recording medium can be provided in the form of what is called package software.

Further, the program may be installed from a removable recording medium to a computer or may be transferred, by wire or by radio waves, from a download site to a computer over a network such as a LAN (Local Area Network) or the Internet. The computer receives the program thus transferred, so that the program can be installed into an inner recording medium such as an inner hard disk or the like.

It is to be noted that the effects described in the present description are just examples and are not limited, and thus, any additional effect which is not described herein may be provided. In addition, the present technique should not be interpreted by being limited to the abovementioned embodiments. The present technique is disclosed by exemplified by the embodiments according to the present technique. It is obvious that a person skilled in the art can make modifications or substitutions on the embodiments within the gist of the present technique. That is, the claims should be considered in order to assess the gist of the present technique.

Further, the present technique may also have the following configurations.

(1)

An information processing device including:

a motion detecting section that detects a change in a relative position relation between an image capturing section and a subject; and a thinning-out setting section that sets a thinning-out amount of a line thinning-out operation of the image capturing section according to a detection result obtained by the motion detecting section.

(2)

The information processing device according to (1), in which the thinning-out setting section increases the thinning-out amount with increase of the change detected by the motion detecting section.

(3)

The information processing device according to (2), in which in a case where the change in the relative position relation detected by the motion detecting section has occurred due to rotation of the image capturing section, the thinning-out setting section performs a line thinning-out operation that is uniform all over a screen.

(4)

The information processing device according to (2) or (3), in which in a case where the change in the relative position relation detected by the motion detecting section has occurred due to movement of the image capturing section in an optical axis direction, the thinning-out setting section sets a thinning-out amount in a region in which the change in the relative position relation having occurred due to the movement of the image capturing section in the optical axis direction is larger, to be larger than a thinning-out amount in a region in which the change is smaller.

(5)

The information processing device according to any one of (1) to (4), further including:

a reading-out setting section that sets a direction of a line reading-out order in the image capturing section according to the detection result obtained by the motion detecting section.

(6)

The information processing device according to (5), in which in a case where the change in the relative position relation detected by the motion detecting section has occurred due to forward movement of the image capturing section in the optical axis direction, the reading-out setting section sets the direction of the line reading-out order to be downward, and, in a case where the change has occurred due to rearward movement of the image capturing section in the optical axis direction, the reading-out setting section sets the direction of the line reading-out order to be upward.

(7)
The information processing device according to any one of (1) to (6), in which
the motion detecting section detects the change in the relative position relation on the basis of motion of a moving body on which the image capturing section is mounted.

(8)
The information processing device according to (7), in which
the moving body includes a vehicle, and the change in the relative position relation is detected on the basis of a vehicle speed and a steering angle.

(9)
The information processing device according to (7), in which
the motion detecting section detects the change in the relative position relation on the basis of a measurement result obtained by an inertial measurement section that is provided to the moving body on which the image capturing section is mounted.

(10)
The information processing device according to (1), in which
the motion detecting section detects the change in the relative position relation on the basis of an image capturing scene.

(11)
The information processing device according to (1), in which
the motion detecting section detects the change in the relative position relation on the basis of an image obtained by the image capturing section.

(12)
The information processing device according to any one of (1) to (11), further including:
a recognition processing section that performs subject recognition in an image obtained by the image capturing section, by using a recognizer corresponding to the thinning-out amount set by the thinning-out setting section.

(13)
The information processing device according to (12), in which
the recognition processing section performs the subject recognition by using a preliminarily generated dictionary according to the thinning-out amount.

(14)
The information processing device according to (12), in which
the recognition processing section uses a recognizer corresponding to a thinning-out amount that is set for each region by the thinning-out setting section.

(15)
The information processing device according to any one of (12) to (14), further including:
a reading-out setting section that sets a direction of a line reading-out order in the image capturing section according to the detection result obtained by the motion detecting section, in which
the recognition processing section performs the subject recognition by using a recognizer corresponding to the thinning-out amount set by the thinning-out setting section and corresponding to the direction of the reading-out order set by the reading-out setting section.

(16)
The information processing device according to any one of (1) to (15), further including:
an image processing section that conducts a corresponding-point search by using an image obtained by the image capturing section, in which
the image processing section adjusts a search range according to the thinning-out amount set by the thinning-out setting section.

(17)
The information processing device according to (16), in which
the image processing section adjusts reliability of a corresponding point according to the thinning-out amount set by the thinning-out setting section.

(18)
The information processing device according to any one of (1) to (17), further including:
the image capturing section that performs a rolling shutter operation.

INDUSTRIAL APPLICABILITY

In an information processing device, an information processing method, and a program according to the present technique, a thinning-out amount of a line thinning-out operation of an image capturing section is set according to a change in the relative position relation between the image capturing section and a subject. Accordingly, a subject image having little distortion is obtained. Therefore, the present technique is applicable to a device that is mounted on a moving body, and the like.

REFERENCE SIGNS LIST

10 . . . Image capturing system
20 . . . Image capturing section
21 . . . Image capturing lens
22 . . . Image sensor
30-1, 30-2, 30-3, 30-4 . . . Signal processing section
31 . . . Motion detecting section
32 . . . Thinning-out setting section
33 . . . Regional distortion-amount estimating section
34 . . . Regional thinning-out setting section
35 . . . Reading-out setting section
36 . . . Interpolation processing section
37-1, 37-2, 37-3, 37-4 . . . Recognition processing section
38 . . . Image processing section
371-1, 371-2, 371-3 . . . Recognizer switching section
372-1 to 372-n, 372-d1 to 372-dn, 372-u1 to 372-un . . . Recognizer

The invention claimed is:
1. An information processing device comprising:
a memory to store instructions; and
circuitry configured to
detect a change in a relative position relation between an image sensor and a subject, by executing at least one of the instructions stored in the memory, and
set a thinning-out amount of a line thinning-out operation of the image sensor according to a detection result, the thinning-out amount being increased with increase of the change, by executing at least one of the instructions stored in the memory,
wherein, in a case where the change in the relative position relation has occurred due to rotation of the image sensor, the line thinning-out operation is performed as to be uniform all over a screen.

2. The information processing device according to claim 1, wherein
in a case where the change in the relative position relation has occurred due to movement of the image sensor in an optical axis direction, the circuitry is configured to set a thinning-out amount in a region in which the change in the relative position relation having occurred due to the movement of the image sensor in the optical axis direction is larger, to be larger than a thinning-out amount in a region in which the change is smaller.

3. The information processing device according to claim 1, wherein the circuitry is further configured to
set a direction of a line reading-out order in the image sensor according to the detection result.

4. The information processing device according to claim 3, wherein
in a case where the change in the relative position relation has occurred due to forward movement of the image in an optical axis direction, the circuitry is configured to set the direction of the line reading-out order to be downward, and, in a case where the change has occurred due to rearward movement of the image sensor in the optical axis direction, the circuitry is configured to set the direction of the line reading-out order to be upward.

5. The information processing device according to claim 1, wherein
the circuitry is configured to detect the change in the relative position relation on a basis of motion of a moving body on which the image sensor is mounted.

6. The information processing device according to claim 5, wherein
the moving body includes a vehicle, and the change in the relative position relation is detected on a basis of a vehicle speed and a steering angle.

7. The information processing device according to claim 5, wherein
the circuitry is configured to detect the change in the relative position relation on a basis of a measurement result that is provided to the moving body on which the image sensor is mounted.

8. The information processing device according to claim 1, wherein
the circuitry is configured to detect the change in the relative position relation on a basis of an image capturing scene.

9. The information processing device according to claim 1, wherein
the circuitry is configured to detect the change in the relative position relation on a basis of an image obtained by the image sensor.

10. The information processing device according to claim 1, wherein the circuitry is further configured
perform subject recognition in an image obtained by the image sensor, by using a recognizer corresponding to the thinning-cut amount.

11. The information processing device according to claim 10, wherein
the circuitry is configured to perform the subject recognition by using a preliminarily generated dictionary according to the thinning-out amount.

12. The information processing device according to claim 10, wherein
the circuitry is configured to use a recognizer corresponding to a thinning-out amount that is set for each region.

13. The information processing device according to claim 10, wherein the circuitry is further configured to
set a direction of a line reading-out order in the image sensor according to the detection result, wherein
the circuitry is configured to perform the subject recognition by using a recognizer corresponding to the thinning-out amount and corresponding to the direction of the reading-out order.

14. The information processing device according to claim 1, wherein the circuitry is further configured to
conduct a corresponding-point search by using an image obtained by the image sensor, wherein
the circuitry is configured to adjust a search range according to the thinning-out amount.

15. The information processing device according to claim 14, wherein
the circuitry is configured to adjust reliability of a corresponding point according to the thinning-out amount.

16. The information processing device according to claim 1, further comprising:
the image sensor that performs a rolling shutter operation.

17. An information processing method comprising:
detecting, a change in a relative position relation between an image sensor and a subject; and
setting, a thinning-out amount of a line thinning-out operation of the image sensor according to a detection result, the thinning-out amount being increased with increase of the change,
wherein, in a case where the change in the relative position relation has occurred due to rotation of the image sensor, the line thinning-out operation is performed as to be uniform all over a screen.

18. A non-transitory computer-readable storage medium including computer executable instructions, wherein the instructions, when executed by an information processing system, cause the information processing system to perform a method, the method comprising
detecting a change in a relative position relation between an image sensor and a subject; and
setting a thinning-out amount of a line thinning-out operation of the image sensor according to the change in the relative position relation, the thinning-out amount being increased with increase of the change,
wherein, in a case where the change in the relative position relation has occurred due to rotation of the image sensor, the line thinning-out operation is performed as to be uniform all over a screen.

* * * * *